US011774977B1

(12) United States Patent
Jones

(10) Patent No.: US 11,774,977 B1
(45) Date of Patent: Oct. 3, 2023

(54) SYSTEMS, APPARATUS, AND METHODS FOR OPTIMIZATION OF AUTONOMOUS VEHICLE WORKLOADS

(71) Applicant: 6 River Systems, LLC, Waltham, MA (US)

(72) Inventor: Catherine Jones, Waltham, MA (US)

(73) Assignee: 6 River Systems, LLC, Waltham, MA (US)

( * ) Notice: Subject to any disclaimer, the term of this patent is extended or adjusted under 35 U.S.C. 154(b) by 0 days.

(21) Appl. No.: 17/712,891

(22) Filed: Apr. 4, 2022

(51) Int. Cl.
*G05D 1/02* (2020.01)

(52) U.S. Cl.
CPC ... *G05D 1/0219* (2013.01); *G05D 2201/0216* (2013.01)

(58) Field of Classification Search
CPC ......... G05D 1/0219; G05D 2201/0216; G05D 1/0088; G05D 1/0287; G06Q 10/06316
See application file for complete search history.

(56) References Cited

U.S. PATENT DOCUMENTS

| | | |
|---|---|---|
| 7,509,671 B1 | 3/2009 | Bedell et al. |
| 9,834,380 B2 | 12/2017 | Hamilton et al. |
| 10,089,586 B2 | 10/2018 | Vestal et al. |
| 10,220,705 B2 * | 3/2019 | Ramanujam ........... G08G 1/202 |
| 10,241,644 B2 | 3/2019 | Gruber et al. |
| 10,513,033 B2 | 12/2019 | Johnson et al. |
| 10,814,489 B1 | 10/2020 | Kalouche et al. |
| 11,400,823 B1 * | 8/2022 | Sampath ................. B60L 58/12 |
| 2012/0078673 A1 | 3/2012 | Koke et al. |
| 2014/0136255 A1 | 5/2014 | Grabovski et al. |
| 2015/0266672 A1 | 9/2015 | Lert et al. |
| 2015/0338852 A1 * | 11/2015 | Ramanujam ........... G08G 1/202 701/2 |
| 2018/0158020 A1 | 6/2018 | Khasis |

(Continued)

FOREIGN PATENT DOCUMENTS

JP          2022509762 A  *  1/2022

OTHER PUBLICATIONS

Machine Translation JP 2022509762 (Year:2022).*

(Continued)

*Primary Examiner* — Anne Marie Antonucci
*Assistant Examiner* — Jewel Ashley Kuntz
(74) *Attorney, Agent, or Firm* — HANLEY, FLIGHT & ZIMMERMAN, LLC

(57) ABSTRACT

Example systems, methods, and apparatus to optimize autonomous vehicle workflows are disclosed. An example apparatus includes at least one memory; instructions; and a processor to execute the instructions to determine an expected arrival time for an autonomous vehicle at a first location, the autonomous vehicle to deliver a first product to the first location in response to a first task assigned to the autonomous vehicle, the first product associated with a first order; perform a comparison between the expected arrival time for the autonomous vehicle and an expected arrival time associated with a second task; select a third task to be performed by the autonomous vehicle based on the comparison, the third task selected for having the autonomous vehicle arrive at the first location after performance of the third task within a threshold time of the expected arrival time; and instruct the autonomous vehicle to perform the third task.

20 Claims, 8 Drawing Sheets

(56) References Cited

U.S. PATENT DOCUMENTS

| | | |
|---|---|---|
| 2019/0217478 A1 | 7/2019 | Johnson et al. |
| 2019/0275676 A1 | 9/2019 | Jensen et al. |
| 2020/0160242 A1 | 5/2020 | Johnson et al. |
| 2020/0180874 A1 | 6/2020 | Mattern et al. |
| 2020/0342419 A1* | 10/2020 | Zatta ........................ B60S 5/00 |
| 2020/0342420 A1* | 10/2020 | Zatta ................ G06Q 10/06314 |
| 2021/0116940 A1* | 4/2021 | Fukunaga ........ G06Q 10/06316 |
| 2022/0155781 A1 | 5/2022 | Cacioppo |
| 2022/0179416 A1 | 6/2022 | Cacioppo |
| 2022/0397404 A1 | 12/2022 | Franey et al. |
| 2022/0397912 A1 | 12/2022 | Franey et al. |
| 2023/0022085 A1 | 1/2023 | Leonardo et al. |

OTHER PUBLICATIONS

Scholz et al., "Order picking with multiple pickers and due dates—Simultaneous solution of Order Batching, Batch Assignment and Sequencing, and Picker Routing Problems," European Journal of Operational Research, vol. 263, Issue 2, Dec. 1, 2017, pp. 461-473, 18 pages.

\* cited by examiner

SYSTEMS, APPARATUS, AND METHODS FOR OPTIMIZATION OF AUTONOMOUS VEHICLE WORKLOADS

FIELD OF THE DISCLOSURE

This disclosure relates generally to autonomous vehicles and, more particularly, to systems, methods, and apparatus to optimize autonomous vehicle workflows.

BACKGROUND

A warehouse may employ individuals as well as equipment such as autonomous vehicles, forklifts, etc. to retrieve inventory (e.g., products) stored in the warehouse. A consumer may place an order for one or more products stored in the warehouse. In some instances, an autonomous vehicle is used to deliver product(s) associated with the order from product storage location(s) in the warehouse to an order assembly area in the warehouse for, for instance, packaging of the products of the order. An individual may manually carry other product(s) in the order and/or use other equipment (e.g., a forklift) to deliver other product(s) in the order to the order assembly area.

BRIEF DESCRIPTION OF THE DRAWINGS

In general, the same reference numbers will be used throughout the drawing(s) and accompanying written description to refer to the same or like parts. The figures are not to scale.

Figure 1:
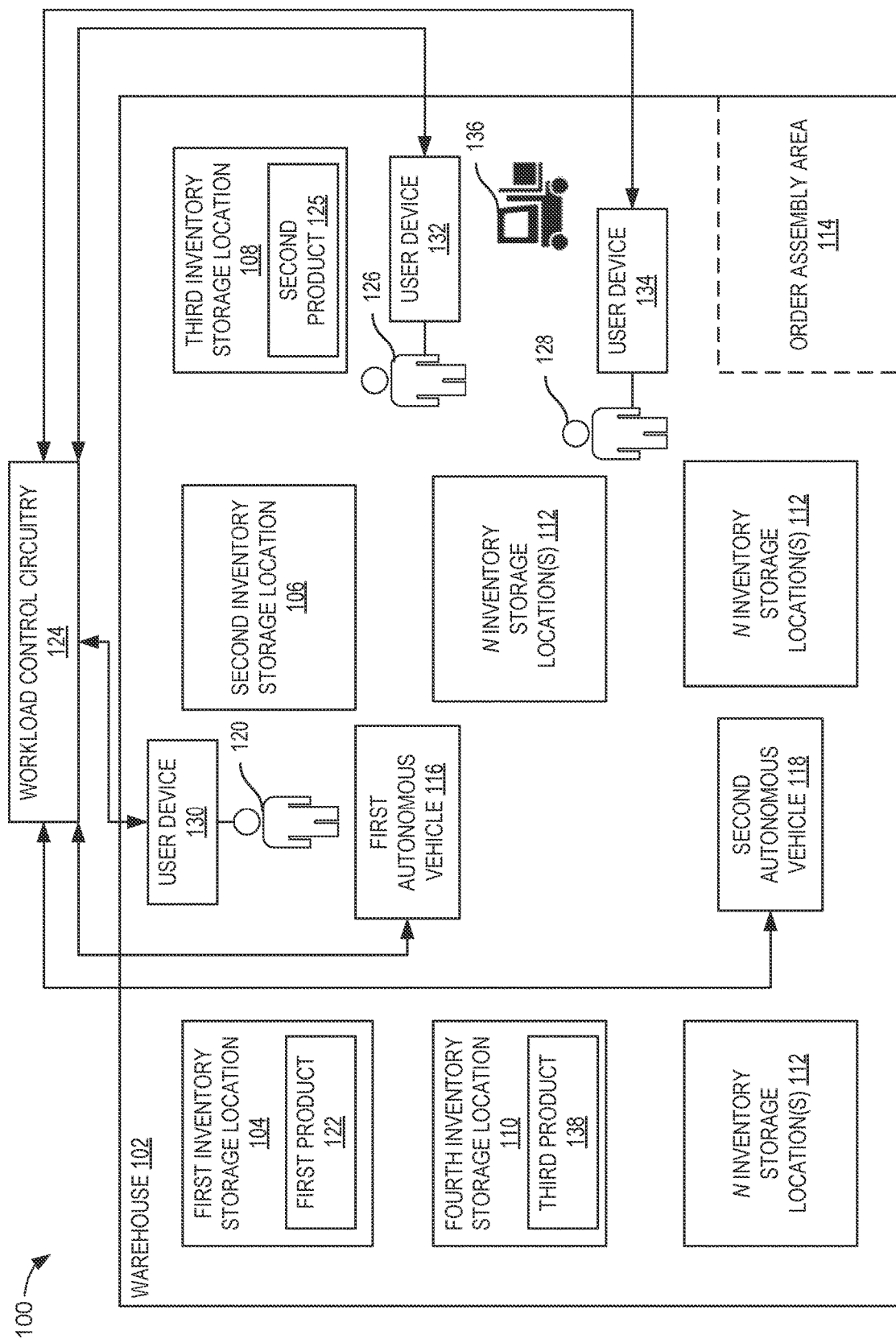
FIG. 1 illustrates an example system in accordance with teachings of this disclosure including autonomous vehicles and example workload control circuitry for managing workloads of the autonomous vehicles in accordance with teachings of this disclosure.

Unless specifically stated otherwise, descriptors such as "first," "second," "third," etc., are used herein without imputing or otherwise indicating any meaning of priority, physical order, arrangement in a list, and/or ordering in any way, but are merely used as labels and/or arbitrary names to distinguish elements for ease of understanding the disclosed examples. In some examples, the descriptor "first" may be used to refer to an element in the detailed description, while the same element may be referred to in a claim with a different descriptor such as "second" or "third." In such instances, it should be understood that such descriptors are used merely for identifying those elements distinctly that might, for example, otherwise share a same name.

As used herein, the phrase "in communication," including variations thereof, encompasses direct communication and/or indirect communication through one or more intermediary components, and does not require direct physical (e.g., wired) communication and/or constant communication, but rather additionally includes selective communication at periodic intervals, scheduled intervals, aperiodic intervals, and/or one-time events.

As used herein, "processor circuitry" is defined to include (i) one or more special purpose electrical circuits structured to perform specific operation(s) and including one or more semiconductor-based logic devices (e.g., electrical hardware implemented by one or more transistors), and/or (ii) one or more general purpose semiconductor-based electrical circuits programmed with instructions to perform specific operations and including one or more semiconductor-based logic devices (e.g., electrical hardware implemented by one or more transistors). Examples of processor circuitry include programmed microprocessors, Field Programmable Gate Arrays (FPGAs) that may instantiate instructions, Central Processor Units (CPUs), Graphics Processor Units (GPUs), Digital Signal Processors (DSPs), XPUs, or microcontrollers and integrated circuits such as Application Specific Integrated Circuits (ASICs). For example, an XPU may be implemented by a heterogeneous computing system including multiple types of processor circuitry (e.g., one or more FPGAs, one or more CPUs, one or more GPUs, one or more DSPs, etc., and/or a combination thereof) and application programming interface(s) (API(s)) that may assign computing task(s) to whichever one(s) of the multiple types of the processing circuitry is/are best suited to execute the computing task(s).

DETAILED DESCRIPTION

An autonomous vehicle may be used in a warehouse or other environment that stores inventory to assist a user in carrying inventory from a location in the warehouse to another location in the warehouse. For example, the autonomous vehicle can carry a product associated with an order from the location in the warehouse where the product is stored to an order assembly area for, for instance, packaging and shipping of the order.

In some instances, two or more products associated with an order may be located in different locations in the warehouse. The autonomous vehicle may be used to guide a first individual to a location of a first product in the warehouse, where the first product can be loaded on the autonomous vehicle. The autonomous vehicle can carry the first product to the order assembly area in the warehouse for assembly of the order. In some instances, a second product in an order may be delivered to the order assembly area via a second individual due to, for instance, a size of the product, a weight of the product, a location of the product in the warehouse, etc. In such examples, the second individual may manually carry the product, load the product onto a pushcart, a forklift, etc. to deliver the product to the packing area for assembly of the order with the product(s) delivered by the autonomous vehicle.

In some instances, an autonomous vehicle carrying product(s) of an order may arrive at the order assembly area at a different time than other autonomous vehicle(s) carrying product(s) of the order and/or individual(s) carrying product(s) in the order (e.g., manually carrying or using other equipment). For example, the product that is manually carried by the individual may arrive at the order assembly area at a later time than the product(s) carried by the autonomous vehicle. However, if the autonomous vehicle is idle for a period of time while, for instance, waiting for the order to be completed with the product(s) delivered by the individual, then the efficiency of warehouse operations can be affected. Idle autonomous vehicles result in wasted computational resources, increased order fulfillment times, increased traffic congestion in the warehouse between vehicles and individuals and/or other equipment, etc.

Disclosed herein are example apparatus, systems, and methods that provide for management of workloads assigned to autonomous vehicles to optimize utilization of the autonomous vehicles. In particular, examples disclosed herein manage workloads assigned to autonomous warehouse vehicles in instances in which fulfillment of an order is divided between an autonomous vehicle that is used to carry product(s) associated with a portion of an order and another autonomous vehicle and/or individual(s) (e.g., warehouse employee(s)) who facilitate retrieval of remaining product(s) in the order from the storage location(s). For instance, other material handling equipment such as a handcart, a forklift, etc. can be used to carry products in the warehouse. In some examples, the material handling equipment can include autonomous vehicles. In some examples, the material handling equipment is operated by a user (e.g., driven by a user). In some examples, an individual may manually carry product(s) in the warehouse.

Examples disclosed herein optimize use of autonomous vehicle(s) for order fulfillment in view of orders that may be split or divided between autonomous vehicle(s) that are used to deliver portion(s) of an order and individual(s) that facilitate delivery of remaining portion(s) of the order to the order assembly area of the warehouse. Examples disclosed herein dynamically track operation of an autonomous vehicle to synchronize performance of task(s) by the autonomous vehicle (e.g., delivery of product(s) of an order by the autonomous vehicle to the order assembly area) with performance of task(s) by other autonomous vehicle(s) and/or individual(s) (e.g., delivery of remaining product(s) in the order to the packing area by a user who is are manually carrying the product(s) and/or using other equipment deliver the product(s).

Examples disclosed herein determine workload(s) or task(s) to be assigned to the autonomous vehicle to optimize usage of the vehicle during performance of task(s) in connection with an order. Examples disclosed herein analyze historical data associated with product retrieval and/or delivery times of the autonomous vehicle(s), individual(s), and/or other material handling equipment (e.g., forklifts) in connection with substantially real-time data collected during fulfillment of the order. In examples disclosed herein, if the autonomous vehicle carrying product(s) for an order will arrive at the packing area prior to an expected (e.g., predicted) time at which the other product(s) associated with an order (e.g., a product delivered by an individual) will arrive at the packing or order assembly area, then the autonomous vehicle is assigned additional task(s) or workload(s). Example disclosed herein determine additional task(s) or workload(s) that can be completed by the autonomous vehicle such that the autonomous vehicle arrives at the packing area within a threshold amount of time relative to a time at which the other product(s) of the order are expected to arrive at the packing area. As a result, the autonomous vehicle is efficiently utilized to complete workload(s) while synchronizing performance of the task(s) by the autonomous vehicle with performance of task(s) by individuals(s) and/or other autonomous vehicle(s).

Some examples disclosed herein facilitate synchronization with respect to performance of task(s) by the autonomous vehicle and the individual(s) by managing workload(s) assigned to users (e.g., warehouse employees). For instance, examples disclosed herein can optimize order fulfillment times by instructing the user(s) to arrive at the packing area at a particular time and/or to complete workload(s) in a particular order based on, for instance, an expected arrival time of the autonomous vehicle at the packing area. Some examples disclosed herein can identify or assign additional task(s) to be performed by the users while fulfilling an order to increase warehouse efficiency.

Although examples disclosed herein are discussed in connection with a warehouse storing inventory, examples disclosed herein can be implemented in connection with other environments including autonomous vehicles. Thus, examples disclosed herein are not limited to inventory storage warehouses.

FIG. 1 illustrates an example system 100 in accordance with teachings of this disclosure. In the example of FIG. 1, a warehouse 102 stores inventory (e.g., product(s)) for one or more merchants (e.g., retailer(s), seller(s), or other provider(s)). The warehouse 102 includes storage locations for storing inventory, such as shelves, boxes, bins, baskets, and/or other means for storing inventory. For illustrative purposes, the warehouse 102 of FIG. 1 includes a first inventory storage location 104, a second inventory storage location 106, a third inventory storage location 108, a fourth inventory storage location 110, and n other inventory storage location(s) 112. Each of the storage locations 104, 106, 108, 110, 112 stores one or more products. The example warehouse 102 of FIG. 1 includes an order assembly area 114. In the example of FIG. 1, product(s) retrieved from the storage location(s) 104, 106, 108, 110, 112 associated with an order (e.g., an order received via a website of retailer or other seller) are delivered to the order assembly area 114 where, for instance, packaging of the order is performed.

In the example of FIG. 1, one or more autonomous vehicles (or automated vehicles) are used to retrieve product(s) from the storage location(s) 104, 106, 108, 110, 112 to facilitate fulfillment of an order for the product(s). In the example of FIG. 1, a first autonomous vehicle 116 and a second autonomous vehicle 118 are located in the warehouse 102. The warehouse 102 can include additional or fewer autonomous vehicles than shown in FIG. 1.

In the example system 100 of FIG. 1, the autonomous vehicles 116, 118 are communicatively coupled to workload control circuitry 124 (e.g., processor circuitry). The autonomous vehicles 116, 118 travel around the warehouse 102 to particular storage locations 104, 106, 108, 110, 112 in response to instructions received from workload control circuitry 124. For example, the workload control circuitry 124 can assign a task or workload to the first autonomous vehicle 116 in connection with a first order to cause the first autonomous vehicle 116 to move to the first inventory storage location 104 and to leave the first inventory storage location 104 when a first user 120 (e.g., a warehouse employee) has loaded a first product 122 from the first inventory storage location 104 onto the first autonomous vehicle 116. The task can instruct the first autonomous vehicle 116 to carry the first product 122 to the order assembly area 114.

In some examples, the first order includes a second product 125. In the example of FIG. 1, the second product 125 is stored at the third inventory storage location 108. In some examples, the workload control circuitry 124 instructs the first autonomous vehicle 116 or the second autonomous vehicle 118 to travel to the third inventory storage location 108 for retrieval of the second product 125 from the third inventory storage location 108 (e.g., via robotic arm of the vehicle 116, 118; via user who places the product 125 on the vehicle 116, 118).

As disclosed herein, in other examples, the workload control circuitry 124 determines that, based on one or more properties of the second product 125 (e.g., size, weight, location, etc.), a warehouse employee, such as the first user 120, a second user 126, or a third user 128 should retrieve the second product from the third inventory storage location 108 without use of the autonomous vehicles 116, 118. In such examples, the workload control circuitry 124 outputs instructions to a first user device 130 (e.g., a smartphone, a handheld electronic device, etc.) associated with the first user 120, a second user device 132 associated with the second user 126 (e.g., a warehouse employee), or a third user device 134 associated with the third user 128 (e.g., a warehouse employee) indicating that the respective user or personnel 120, 126, 128 should retrieve the second product 125. In such instances, the instructions from the workload control circuitry 124 instruct the respective user 120, 126, 128 to retrieve the second product 125 and deliver the second product 125 to the order assembly area 114. Additional or fewer users (e.g., warehouse employees) can be located in the warehouse 102 at a given time.

As disclosed herein, in some examples, the workload control circuitry 124 determines that, based on one or more properties of the second product 125 (e.g., size, weight, location, etc.), other material handling equipment 136, such as a forklift, handcart, etc. should be used by the user 120, 126, 128 to retrieve the second product 125 from the third inventory storage location 108 and deliver the second product 125 to the order assembly area 114. In such examples, the workload control circuitry 124 outputs instructions to the user device(s) 130, 132, 134 to instruct the user(s) 120, 126, 128 to use the material handling equipment 136 to retrieve the second product 125. When the first product 122 and the second product 125 of the order have been delivered to the order assembly area 114, the order can be packaged, prepared for delivery to the consumer (e.g., shipping), etc.

Thus, in certain instances, retrieval of two or more products of an order from the inventory storage locations and delivery to the order assembly area 114 may be divided between, for instance, (a) use of one or more of the autonomous vehicle(s) 116, 118 and/or (b) one or more of the user(s) or personnel 120, 126, 128 manually carrying the product(s) and/or using the other material handling equipment 136 to carry the product(s) to the order assembly area 114. However, the arrival times of the respective products of the order at the order assembly area 114 may differ based on, for instance, whether a product is carried by one of the autonomous vehicles 116, 118 or whether a product is manually carried by one of the user(s) 120, 126, 128, etc. As a result, the autonomous vehicle(s) 116, 118 may complete a task such as delivering a product of an order to the order assembly area 114 before the remaining portion of the order is retrieved and/or delivered to the order assembly area 114. Thus, the autonomous vehicle(s) 116, 118 may have idle time after completing task(s) associated with an order.

The example workload control circuitry 124 monitors activity of the autonomous vehicle(s) 116, 118 when performing task(s) associated with an order, such as traveling to an inventory storage location. The workload control circuitry 124 synchronizes or substantially synchronizes delivery of product(s) of an order to the order assembly area 114 by the autonomous vehicle(s) 116, 118 with the delivery of other product(s) in the order to the order assembly area 114 by, for instance, the user(s) 120, 126, 128 who are manually delivering the products to the area 114.

For example, the workload control circuitry 124 allocates or assigns a task to one of the autonomous vehicles 116, 118 in connection with a first order, such as traveling to the first storage inventory location 104 to retrieve the first product 122 of the first order. Also, the workload control circuitry 124 assigns a task to, for example, the second user 126 to retrieve the second product 125 of the first order from the third inventory storage location 108. The workload control circuitry 124 monitors activity of the selected autonomous vehicle 116, 118 and/or the second user 126 in completing the assigned tasks. The workload control circuitry 124 determines (e.g., predicts) an expected arrival time of the first product 122 and the second product 125 at the order assembly area 114 (e.g., performance or completion times associated with the tasks). Based on the respective estimated arrival times, the workload control circuitry 124 determines if the autonomous vehicle 116, 118 can perform additional task(s) or workload(s) associated with the first order or task(s) or workload(s) associated with another order such that the autonomous vehicle 116, 118 can perform the additional task(s) and arrive at the order assembly area 114 with the first product 122 within a threshold time of the arrival of the second product 125 at the order assembly area 114.

As a further example, the workload control circuitry 124 can determine that the first autonomous vehicle 116 will arrive at the order assembly area 114 with the first product 125 at a first time and the second user 126 will arrive at the order assembly area 114 with the second product 125 at a second time that is ten minutes after the first time. The workload control circuitry 124 determines if there is a task that can be assigned to the first autonomous vehicle 116 that can be completed such that the first autonomous vehicle 116 can complete the additional task and arrive at the order assembly area 114 with the first product 122 within a threshold amount of time of the arrival of the second user 126 with the second product 125. For instance, based on the location of the first autonomous vehicle 116 proximate to the fourth inventory storage location 110, the workload control circuitry 124 can instruct the first autonomous vehicle 116 to travel to the fourth inventory storage location 110 to retrieve a third product 138 associated with another (second) order from the fourth inventory storage location 110 after receiving the first product 122 and before delivering the first product 122 to the order assembly area 114. Thus, the workload control circuitry 124 facilitates synchronization of the delivery of the products 122, 125 of the first order to the order assembly area 114 while increasing efficient use of the first autonomous vehicle 116 to retrieve the product 138 associated with the other (second) order.

In some examples, the workload control circuitry 124 can additionally or alternatively assign task(s) or workload(s) to the user(s) 120, 126, 128 based on the tracking of the activity of the autonomous vehicle(s) 116, 118 and/or the user(s)

120, 126, 128 in performing tasks associated with one or more orders. For example, the workload control circuitry 124 can send instructions to the second user device 132 to instruct the second user 126 to count inventory at the third inventor storage location 108 when retrieving the second product 125 from the third inventory storage location 108. The workload control circuitry can assign the task to the second user 126 if the workload control circuitry 124 determines that performing the inventory counting activity will also permit the second user 126 to deliver the second product 125 to the order assembly area 114 within a threshold time as the delivery of the first product 122 by the first autonomous vehicle 116. The workload control circuitry 124 can assign other tasks to the user(s) 120, 126, 128 such as retrieving another product manually, loading another autonomous vehicle in the warehouse 102 with a product, etc.

Although examples disclosed herein are discussed in connection with synchronization and performance of tasks in connection with the order assembly area 114 of FIG. 1, in some examples, performance of one or more of the tasks are associated with different locations in the warehouse 102 (e.g., delivery of a product to a different location than the order assembly area 114, where the user 120, 126, 128 may deliver a product a first location in the warehouse 102 other than the order assembly area 114 and the autonomous vehicle 116, 118 may deliver a second product to the order assembly area 114 or another location in the warehouse).

Figure 2:
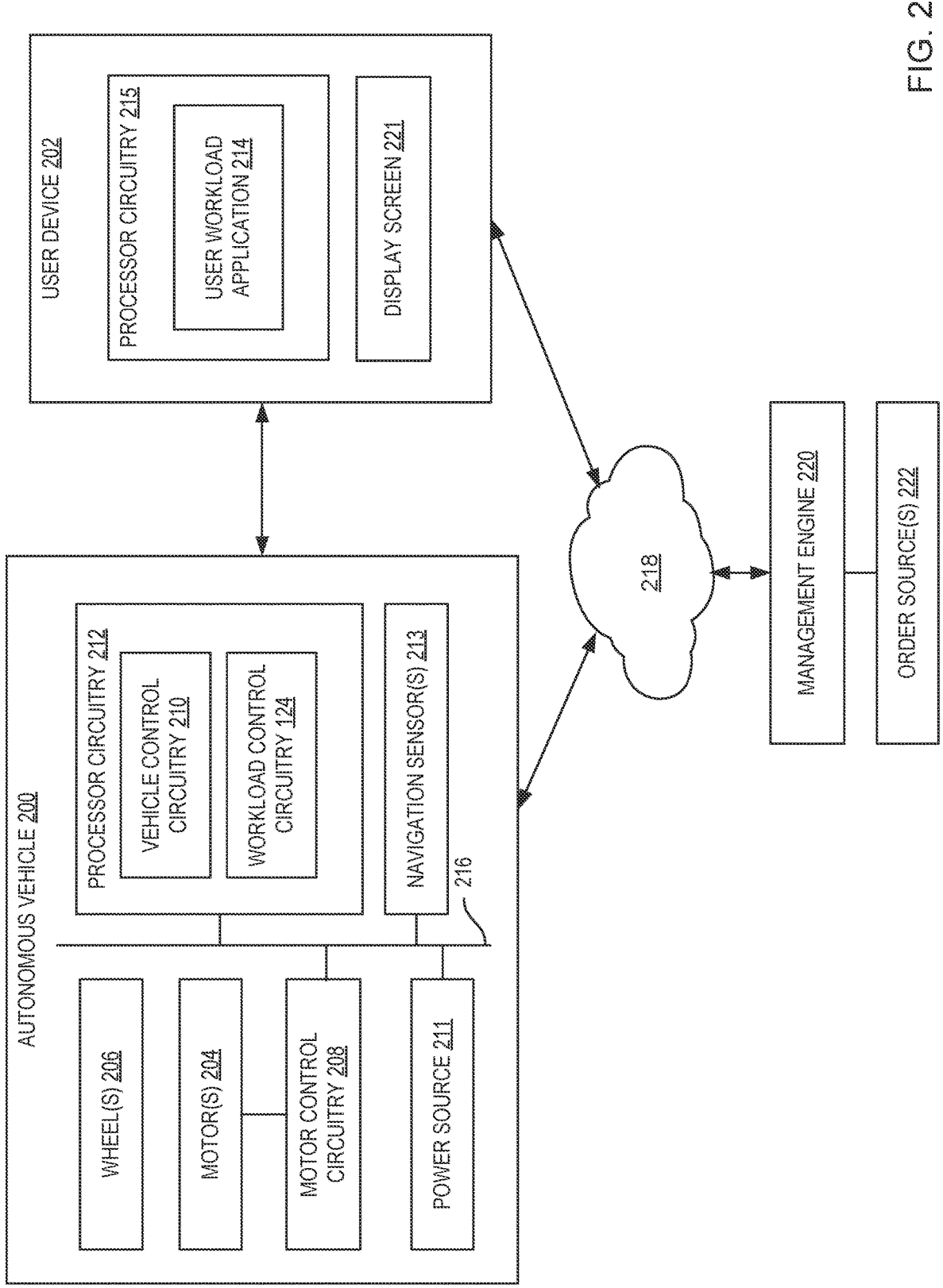
FIG. 2 is a block diagram of an example autonomous vehicle of FIG. 1.

FIG. 2 illustrates an example autonomous vehicle 200, which may be the first autonomous vehicle 116 or the second autonomous vehicle 118 of FIG. 1. FIG. 2 also illustrates an example user device 202, such as the user device 130, 132, 134 of FIG. 1 for use by a user (e.g., the user 120, 126, 128) in the warehouse 102.

The example autonomous vehicle 200 of FIG. 2 moves to a location in the warehouse 102 without or with limited user input control during movement of the vehicle 202. The example autonomous vehicle 200 of FIG. 2 includes one or more motors 204 (e.g., electric motor(s) and/or other drive mechanism(s)) to cause movement of the autonomous vehicle 200 via wheel(s) 206 of the vehicle 200. The autonomous vehicle 200 includes motor control circuitry 208 (e.g., hardware and/or software components) to control, for example, a speed of the vehicle 200. The autonomous vehicle 200 includes vehicle control circuitry 210 to control movement of the autonomous vehicle 200. In the example of FIG. 2, the vehicle control circuitry 210 is implemented by processor circuitry 212 of the vehicle 200. The example vehicle 200 of FIG. 2 includes a power source 211 such as a battery to provide power to the components of the vehicle 200 communicatively coupled via a bus 216.

The example vehicle 200 includes navigation sensors 213 (motion sensor(s) (e.g., accelerometer(s)), GPS receiver(s), image sensor(s), etc.) to output signals indicative of a location of the autonomous vehicle 200 in the warehouse 102. The signals from the navigation sensors 213 can be analyzed by the vehicle control circuitry 210 with respect to controlling movement of the vehicle 200.

In the example of FIG. 2, the workload control circuitry 124 is implemented by executable instructions executed on the processor circuitry 212 of the autonomous vehicle 200. However, in other examples, the workload control circuitry 124 is implemented by processor circuitry 215 of the user device 202 in communication with the autonomous vehicle 200 (e.g., via wired or wireless communication protocols), and/or by a cloud-based device 218 (e.g., one or more server(s), processor(s), and/or virtual machine(s)). In other examples, one or more components of the workload control circuitry 124 is implemented by dedicated circuitry located on the autonomous vehicle 200 and/or the user device 202. These components may be implemented in software, hardware, or in any combination of two or more of software, firmware, and/or hardware.

In the example of FIG. 2, the workload control circuitry 124 is in communication with a management engine 220. The management engine 220 receives orders placed by consumers via one or more order source(s) 222. The order source(s) 222 can include, for example, an online store, a phone order, an order placed with a customer service representative, and/or other sources for collecting or obtaining orders. The workload control circuitry 124 receives information related to an order placed via the order source(s) 222 (e.g., an online store) such as the respective products in the order, a priority level assigned to the order (e.g., an urgent order), an expected fulfillment time or shipment date, etc. As disclosed herein, the workload control circuitry 124 assigns task(s) or workload(s) to the autonomous vehicle 200 based on, for instance, orders received. The vehicle control circuitry 210 of the autonomous vehicle 200 can cause the autonomous vehicle 200 to move to particular locations in the warehouse 102 of FIG. 1 based on the instructions from the workload control circuitry 124.

In the example of FIG. 2, a user workload application 214 is executed by the processor circuitry 215 of the user device 202. The user workload application 214 can receive instructions from the workload control circuitry 124 with respect to, for instance, task(s) or workload(s) assigned to the particular user (e.g., the user 120, 126, 128) with which the user device 202 is associated. The task(s) and/or workload(s) can be displayed via a display screen 221 of the user device 202. A user can provide inputs via the user workload application 214, such as whether a task has been completed, whether a task is unable to be completed, etc. The user task(s) or workload(s) can be associated with a particular order and/or other activities in the warehouse (e.g., counting inventory).

Figure 3:
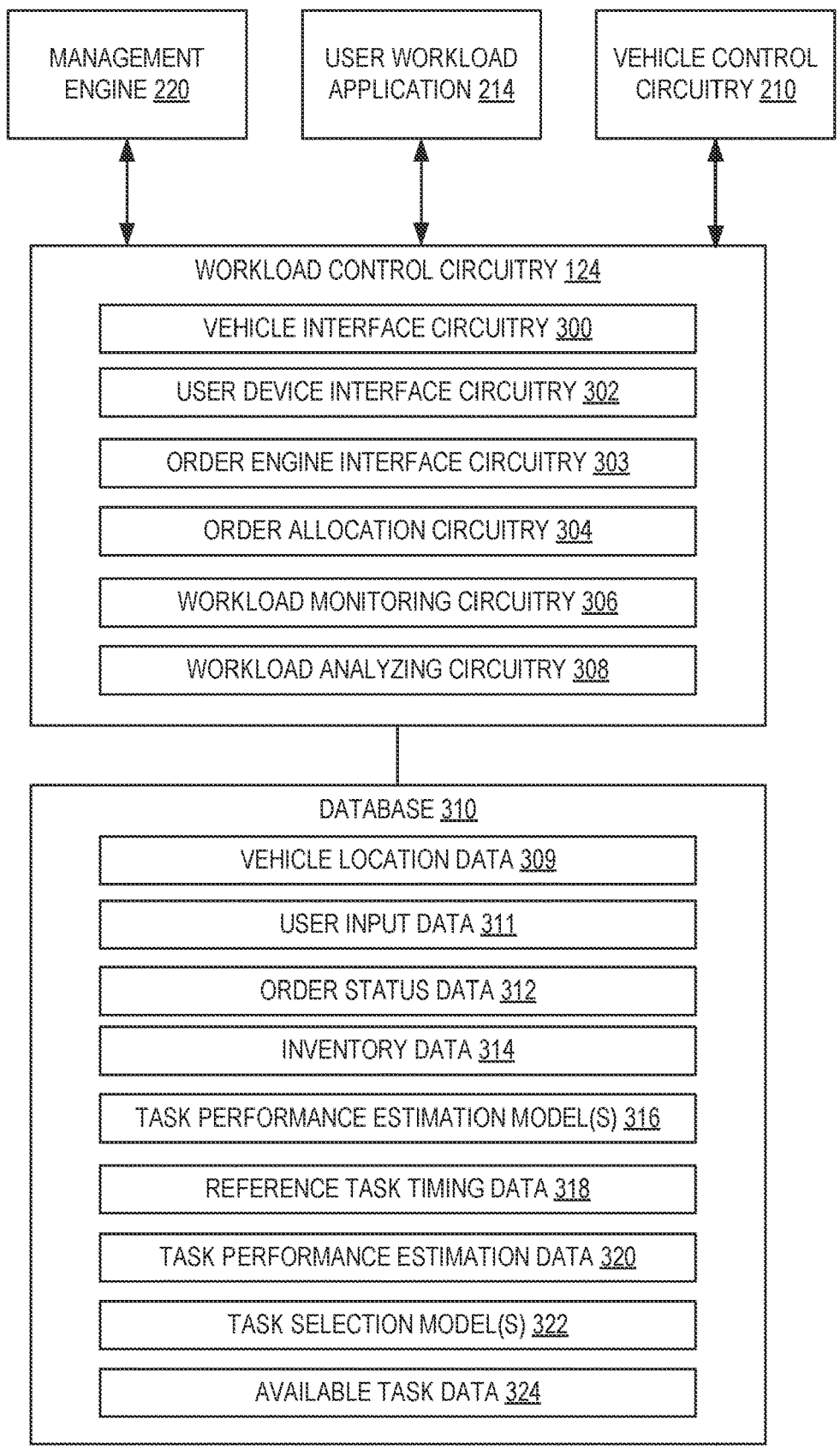
FIG. 3 is a block diagram of the example workload control circuitry of FIG. 1.

FIG. 3 is a block diagram of example workload control circuitry 124 of FIGS. 1 and 2 to manage workload(s) or task(s) assigned to the autonomous vehicle(s) 116, 118, 200 of FIGS. 1 and 2. The workload control circuitry 124 of FIG. 3 may be instantiated (e.g., creating an instance of, bring into being for any length of time, materialize, implement, etc.) by processor circuitry such as a central processing unit executing instructions. Additionally or alternatively, the workload control circuitry 124 of FIG. 3 may be instantiated (e.g., creating an instance of, bring into being for any length of time, materialize, implement, etc.) by an ASIC or an FPGA structured to perform operations corresponding to the instructions. It should be understood that some or all of the circuitry of FIG. 3 may, thus, be instantiated at the same or different times. Some or all of the circuitry may be instantiated, for example, in one or more threads executing concurrently on hardware and/or in series on hardware. Moreover, in some examples, some or all of the circuitry of FIG. 3 may be implemented by one or more virtual machines and/or containers executing on the microprocessor.

The example workload control circuitry 124 of FIG. 3 includes example vehicle interface circuitry 300, example user device interface circuitry 302, example order engine interface circuitry 303, example order allocation circuitry 304, example workload monitoring circuitry 306, and example workload analyzing circuitry 308. In some examples, the workload control circuitry 124 includes a database 310. In some examples, the database 310 is located external to the workload control circuitry 124 in a location accessible to the workload control circuitry 124 as shown in FIG. 3.

The vehicle interface circuitry 300 of the example workload control circuitry 124 facilitates communication with the vehicle control circuitry of the autonomous vehicle(s) 116, 118, 200 of FIGS. 1 and 2 (e.g., via wired or wireless communication protocol(s)). For example, the vehicle interface circuitry 300 can receive data from the vehicle control circuitry 210 of each autonomous vehicle 116, 118, 200 such as a current location of the autonomous vehicle(s) 116, 118, 200 in the warehouse 102. The vehicle location data 309 can be stored in the database 310. In some examples, the vehicle interface circuitry 300 receives the vehicle location data 309 directly from the navigation sensor(s) 213 of the respective vehicles 116, 118, 200. Also, the vehicle interface circuitry 300 of FIG. 3 transmits instructions to the vehicle control circuitry 210 of the respective vehicles 116, 118, 200 to cause the vehicles 116, 118, 200 to, for example, move to a particular location in the warehouse 102.

The user device interface circuitry 302 of the example workload control circuitry 124 facilitates communication with the user workload application 214 installed on the user device(s) 130, 132, 134, 202 of FIGS. 1 and 2 (e.g., via wired or wireless communication protocol(s)). The user device interface circuitry 302 receives user input(s) entered via the user workload application 214 of the respective user devices 130, 132, 134, 202. The user input(s) can be stored as a user input data 311 in the database 310. Also, the user device interface circuitry 302 of FIG. 3 transmits instructions to the user workload application 214 of a respective user device 130, 132, 134, 202 to inform the user 120, 126, 128 of the task(s) assigned to the user.

The order engine interface circuitry 303 of the example workload control circuitry 124 facilitates communication with the management engine 220 (e.g., via wired or wireless communication protocol(s)). In some examples, the order engine interface circuitry 303 receives data from the management engine 220 indicating that, for instance, order(s) have been placed for good(s) stored in the warehouse 102 of FIG. 1. The order(s) can be placed by consumers via, for instance, the order source(s) 222 of FIG. 2.

The order allocation circuitry 304 of the example workload control circuitry 124 of FIG. 3 analyzes orders received or accessed via the order engine interface circuitry 303. For each order, the order allocation circuitry 304 analyzes properties of the order such as the products in the order, a priority level assigned to the order by the management engine 220, etc. The information extracted from the orders by the order allocation circuitry 534 can be stored in the database 310 as order status data 312.

The order allocation circuitry 304 determines if the order can be fulfilled using one or more of the autonomous vehicles 116, 118, 200 to deliver products of the order to the order assembly area 114 of the warehouse 102 of FIG. 1 or if the order should be fulfilled using a combination of (a) one or more of the autonomous vehicles 116, 118, 200 to deliver certain product(s) of the order to the order assembly area 114 of FIG. 1 and (b) individual(s) to facilitate delivery of other product(s) in the order to the order assembly area 114 (e.g., by manually carrying the product(s), by operating a forklift or other material handling equipment, etc.). The order allocation circuitry 304 analyzes the order status data 312, including particular products in the order, based on inventory data 314 stored in the database 310. The inventory data 314 can be defined by user inputs and can identify, for example, characteristics (e.g., weight, shape, etc.) of the products in the order, the storage location(s) 104, 106, 108, 110, 112 of the product(s) in the warehouse 102, etc. In other examples, the inventory data 314 can be obtained from tags or otherwise automatically detected.

The order allocation circuitry 304 allocates or assigns tasks to one or more of the autonomous vehicles 116, 118, 200 and/or the user(s) 120, 126, 128 to retrieve the products associated with an order in the warehouse 102 based on factors such as the product(s) in the order, the order status and/or priority level of the current order and/or other outstanding order(s), previously assigned workload(s) or task(s) to vehicle(s) 116, 118, 200 and/or the individual(s) 120, 126, 128, etc. In some examples, the order allocation circuitry 304 splits or divides the order into one or more portions based on the products, where the fulfillment of the respective portions is treated as tasks to be assigned to the autonomous vehicles 116, 118, 200 and/or to the user(s) 120, 126, 128 (i.e., without use of the autonomous vehicles 116, 118, 200). Each portion of the order can include one or more products. The instructions generated by the order allocation circuitry 304 are output via the vehicle interface circuitry 300 and/or the user device interface circuitry 302. The order status data 312 can also indicate which autonomous vehicle(s) 116, 118, 200 and/or individual(s) 120, 126, 128 have been assigned task(s) associated with the order(s), whether an order has been completed or not, etc.

The example order allocation circuitry 304 of FIG. 3 determines (e.g., predicts, estimates) a time associated with performance of the respective tasks that have been assigned to the autonomous vehicle(s) 116, 118, 200 and/or the user(s) 120, 126, 128. The time associated with performance of the tasks can include, for instance, a time to complete the task, a time to arrive at a destination indicating completion of the task, etc. For instance, the order allocation circuitry 304 estimates arrival times at the order assembly area 114 in connection with performance of the tasks. The order allocation circuitry 304 determines a time at which respective portions of the order that have been allocated to the autonomous vehicle(s) 116, 118, 200 and the user(s) 120, 126, 128 (e.g., without use of the autonomous vehicle(s) 116, 118, 200) will arrive at the order assembly area 114 of the warehouse 102. In the example of FIG. 3, the order allocation circuitry 304 executes one or more task performance estimation model(s) or algorithm(s) 316 to estimate the respective time for each portion of the order that has been associated with an assigned task to arrive at the order assembly area 114 of FIG. 1.

The database 310 of FIG. 3 includes reference task timing data 318. The reference task timing data 318 includes average amounts of time in connection with performance of tasks by the autonomous vehicles 116, 118, 200 and/or other autonomous vehicles in the warehouse 102 and/or other environments. For example, the reference task timing data 318 can include an average amount of time for an autonomous vehicle to travel from each inventory storage location in the warehouse 102 (e.g., the first inventory storage location 104, the third inventory storage location 108) to the order assembly area 114. The reference task timing data 318 also includes an average amount of time for tasks performed by user(s) 120, 126, 128 manually (e.g., walking between different locations in the warehouse 102, counting inventory) and/or using the other material handling equipment 136 (e.g., moving the forklift between locations in the warehouse 102). The reference task timing data 318 can include average loitering time of the autonomous vehicle(s) when waiting for user(s) to arrive to at, for example, the order assembly area 114 from other locations in the warehouse 102. In some examples, the reference task timing data 318 includes cutoff times for carrier(s) who will be delivering the orders(s) assembled at the warehouse 102 (e.g., last pickup time of a carrier, etc.).

The task performance estimation model(s) 316 use variables such as the location(s) of the product(s) in the warehouse 102 and the reference task timing data 318 to predict an estimated arrival time of the products of the order (i.e., portions of the order) at the order assembly area 114 when delivered via an autonomous vehicle and/or when manually carried by the user(s) 120, 126, 128 and/or carried by the other material handling equipment 136 such as a handcart.

In some examples, the task performance estimation model(s) 316 also consider variables such as task(s) assigned to the autonomous vehicle 116, 118, 200 in connection with other order(s) and/or traffic in the warehouse 102 (e.g., a number of other autonomous vehicles moving around the warehouse 102 at a given time) in predicting the time for the tasks to be completed (e.g., the time for the portions of the order to arrive at the order assembly area 114). In some examples, the task performance estimation model(s) 316 account for variables such as a sequence in which the products of the order are to arrive at the order assembly area 114 (e.g., a rule defined in the order status data 312 that a heavier product is to arrive first to faceplate packing of the order, etc.). The results of the task performance estimation model(s) 316 are stored in the database 310 as task performance estimation data 320. The task performance estimation data 320 can include an estimated arrival time associated with each task (e.g., delivery of one or more products of the order) at the order assembly area 114 via the respective delivery means (e.g., via the autonomous vehicle(s) 116, 118, 200, via the user(s) 120, 126, 128).

For example, a first order can include the first product 122, the second product 125, and the third product 138 of FIG. 1. The order allocation circuitry 304 can recognize that the first product 122 and the third product 138 are products that can be carried by the first autonomous vehicle 116. The order allocation circuitry defines the first product 122 and the third product 138 as a first portion of the order. The order allocation circuitry 304 assigns a task to the first autonomous vehicle 116 to travel to the first inventory storage location 104 in the warehouse 102 of FIG. 1 to retrieve the first product 122 and then to the fourth inventory storage location 110 to retrieve the third product 138 and to carry the products 122, 138 to the order assembly area 114. In some examples, the order allocation circuitry 304 instructs the first user 120 (via the user workload application 214 of the first user device 130, via a display screen of an autonomous vehicle or other material handling equipment) to travel to the first inventory storage location 104 to load the first product 122 on the first autonomous vehicle 116 and the fourth inventory storage location 110 to load the third product 138 on the first autonomous vehicle 116.

Continuing the above example, the order allocation circuitry 304 can instruct the third user 128 to retrieve the second product 125 from the third inventory location 108 using the material handling equipment 136 (e.g., a forklift) and to bring the second product 125 to the order assembly area 114. The order allocation circuitry 304 can instruct the third user 128 to use the material handling equipment 136 based on, for instance, the size of the second product 125. The order allocation circuitry defines the second product 125 as a second portion of the order.

The order allocation circuitry 304 executes the task performance estimation model(s) 316 to predict a time at which that task associated with the first portion of the order (i.e., delivery of the first product 122 and the third product 138 to the order assembly area 114) will be completed by the first autonomous vehicle 116. The order allocation circuitry 304 executes the task performance estimation model(s) 316 to predict a time at the task associated with the second portion of the order (i.e., delivery of the second product 125 to the order assembly area 114) be completed by the third user 128 using the forklift. The estimated times are stored as the task performance estimation data 320.

The workload monitoring circuitry 306 of the example workload control circuitry 124 monitors activity with respect to performance and/or completion of the task(s) associated with the portion(s) of an order (e.g., retrieval and/or delivery of the product(s) from the inventory storage area(s)) by the autonomous vehicle(s) 116, 118, 200 and/or the user(s) 120, 126, 128). For example, the workload monitoring circuitry 306 analyzes the vehicle location data 309 to determine a location of the autonomous vehicle 116, 118, 200 in the warehouse 102 relative to a particular inventory storage location 104, 106, 108, 110, 112 to which the autonomous vehicle 116, 118, 200 is to travel. In some examples, the workload monitoring circuitry 306 monitors activity with respect to task(s) for the order based on the user input data 311 indicating that, for instance, a particular product has been loaded onto the autonomous vehicle 116, 118, 200 by the user 120, 126, 128; the user 120, 126, 128 has retrieved a product to be manually carried, etc.

In some examples, the workload monitoring circuitry 306 detects exception(s) with respect to the task(s) associated with an order based on data received from via the autonomous vehicles 116, 118, 200 and/or the user device(s) 130, 132, 134, 202 such as user input(s) indicating that a product is no longer available at the assigned inventory storage location, is defective, etc. In some examples, the workload monitoring circuitry 306 can detect exceptions based on, for example, order status data 312 indicating a change in a priority of orders, which can affect timing for performance and/or completion of the tasks.

Thus, the workload monitoring circuitry 306 of FIG. 3 tracks or monitors the task(s) assigned to the autonomous vehicle(s) 116, 118, 200 and/or the user(s) 120, 126, 128 in the warehouse 102. In some examples, the workload monitoring circuitry 306 updates the order status data 312, the inventory data 314, and/or the reference task timing data 318 based on the monitoring of the activity in the warehouse 102.

In some examples, the order allocation circuitry 304 re-executes the task performance estimation model(s) 316 based on the monitoring by the workload monitoring circuitry 306 to determine (e.g., predict) if there are changes in the estimated arrival time(s) of the portion(s) of the order at the order assembly area 114 relative to the arrival times previously predicted by the order allocation circuitry 304 (e.g., the arrival time(s) predicted before the task(s) were executed). The order allocation circuitry 304 updates the task performance estimation data 320 for the autonomous vehicle(s) 116, 118, 200 and/or the user(s) 120, 126, 128 based on the re-execution of the model(s) 518.

The workload analyzing circuitry 308 of the example workload control circuitry 124 determines if the autonomous vehicle(s) 116, 118, 200 can be assigned additional task(s) to optimize use of the autonomous vehicle(s) 116, 118, 200 in view of the previous task(s) assigned to the autonomous vehicle(s) 116, 118, 200 and the task performance estimation data 320. In particular, when delivery of products of an order to the order assembly area 114 of the warehouse 102 is divided between the autonomous vehicle(s) 116, 118, 200 and the user(s) 120, 126, 128 (e.g., via manual delivery, via other material handling equipment 136 such as a pushcart), the workload analyzing circuitry 308 determines if the autonomous vehicle(s) 116, 118, 200 can be assigned additional task(s) to optimize use of the autonomous vehicle 116, 118, 200 prior to delivering the product(s) of the order to the order assembly area 114. The workload analyzing circuitry 308 determines if the autonomous vehicle(s) 116, 118, 200 could perform additional task(s) or workload(s) while maintaining or substantially maintaining synchronized delivery of the product(s) to the order assembly area 114 with the delivery of the product(s) by the user(s) 120, 126, 128 using delivery methods other than the autonomous vehicle(s) 116, 118, 200 (e.g., manual carrying).

The workload analyzing circuitry 308 compares the task performance estimation data 320 for the task(s) assigned to the autonomous vehicle(s) 116, 118, 200 in connection with portion(s) of the order and the task performance estimation data 320 associated with task(s) assigned to the user(s) 120, 126, 128 (e.g., manual carrying of product(s)) and/or other autonomous vehicle(s) 116, 118, 200 in connection with other portion(s) of the order. The workload analyzing circuitry 308 determines if the autonomous vehicle 116, 118, 200 is scheduled to arrive at the order assembly area 114 within a threshold period of time of the user(s) 120, 126, 128 and/or other vehicle(s) 116, 118, 200 retrieving other products of the order. If the workload analyzing circuitry 308 determines that a difference in the predicted time of arrival of the autonomous vehicle 116, 118, 200 and the predicted arrival time of the user(s) 120, 126, 128 and/or other vehicle(s) 116, 118, 200 at the order assembly area 114 exceeds a threshold amount, the workload analyzing circuitry 308 determines that the autonomous vehicle 116, 118, 200 is available to perform additional task(s) prior to arriving at the order assembly area 114.

For instance, when the autonomous vehicle 116, 118, 200 is assigned a task in connection with a first order (e.g., carry a product to the order assembly area 114), the workload analyzing circuitry 308 selects additional task(s) for the autonomous vehicle 116, 118, 200 to complete in connection with the first order or another order such that the autonomous vehicle 116, 118, 200 can complete the additional task(s) and arrive at the order assembly area 114 within a threshold amount of time of the expected arrival time of the user(s) 120, 126, 128 assigned task(s) associated with the first order. The arrival time threshold(s) can be defined by the reference task timing data 318. In other examples, the workload analyzing circuitry 308 selects additional task(s) for the autonomous vehicle 116, 118, 200 to synchronize arrival of the autonomous vehicle 116, 118, 200 at the order assembly area 114 with arrival of other autonomous vehicle (s) 116, 118, 200 at the order assembly area 114. In some examples, the workload analyzing circuitry 308 selects additional task(s) for the autonomous vehicle 116, 118, 200 to stagger arrival of the autonomous vehicle 116, 118, 200 at the order assembly area 114 in sequence with other autonomous vehicle(s) 116, 118, 200 at the order assembly area 114. The workload analyzing circuitry 308 executes one or more task selection models or algorithms 322 to select additional task(s) to assign the autonomous vehicle(s) 116, 118, 200.

The database 310 includes available task data 324. The available task data 324 can identify open tasks that can be assigned to the autonomous vehicle(s) 116, 118, 200 and/or user(s) 120, 126, 128. In some examples, the available task data 324 is based on the order status data 312 and includes tasks to be completed in connection with orders received by the management engine 220. In some examples, the available task data 324 includes tasks to be performed independent of the order(s), such as inventory counting, clearing of the warehouse 102, etc. to be performed by the user(s) 120, 126, 128.

The workload analyzing circuitry 308 executes the task selection model(s) 322 to select task(s) from the available task data 324. The task selection model(s) 322 consider variables such as the location of the autonomous vehicle 116, 118, 200 in the warehouse 102 relative to the order assembly area 114 (e.g., the vehicle location data 309); location data for other autonomous vehicles 116, 118, 200 in the warehouse 102, which can be indicative of traffic in the warehouse 102; the order status data 312; the task performance estimation data 320 determined by the order allocation circuitry 304; and the reference task timing data 318. In some examples, the task selection model(s) 322 predict an amount of time for performance of available task(s) and select or recommend a task based on the predicted performance time for the additional task(s) and the task performance estimation data 320 for the previously assigned task(s).

The workload analyzing circuitry 308 identifies task(s) to be assigned to the autonomous vehicle 116, 118, 200 as a result of execution of the task selection model(s) 322. In the example of FIG. 3, the workload analyzing circuitry 308 assigns the additional task(s) to the autonomous vehicle 116, 118, 200 if the performance of the additional task(s) will (a) permit the autonomous vehicle 116, 118, 120 to maintain the estimated time associated with performance of the previously assigned task(s) or (b) synchronize performance of the task(s) (i.e., the previously assigned task(s) and the additional task(s)) by the autonomous vehicle 116, 118, 200 within threshold of the time(s) associated with performance of the task(s) assigned to the user(s) 120, 126, 128 and/or the other autonomous vehicle(s) 116, 118, 200 in connection with the order. The instructions generated by the workload analyzing circuitry 308 including the additional task(s) for the autonomous vehicle 116, 118, 200 are transmitted to the autonomous vehicle 116, 118, 200 via the vehicle interface circuitry 300.

As an example, the order allocation circuitry 304 can assign the first autonomous vehicle 116 a first task to deliver the first product 122 associated with a first order to the order assembly area 114. The order allocation circuitry 304 can assign the third user 128 a second task to deliver the second product 125 of the first order to the order assembly area 114 (e.g., manually carry the second product 125 to the order assembly area 114). The order allocation circuitry 304 determines the estimated arrival time associated with the first task (i.e., the arrival of the first autonomous vehicle 116 at the order assembly area 114 with the first product 122) and the estimated arrival time associated with the second task (i.e., the arrival of the third user 128 at the order assembly area 11 with the second product 125.

In the above example, the workload analyzing circuitry 308 can determine that (a) the autonomous vehicle 116 is scheduled to arrive at the order assembly area 114 with the first product 125 of the first order in advance of the third user 128 with the second product 125; (b) the difference in arrival times exceeds a threshold as defined by the reference task timing data 318; and (c) the autonomous vehicle 116 is proximate to an inventory storage location including a product associated with different (second) order, such as the third product 138 at the fourth inventory storage location 110. The workload analyzing circuitry 308 executes the task selection model(s) 322 and determines that the autonomous vehicle 116 can be assigned a task associated with the second order while still arriving at the order assembly area 114 within a threshold time of the third user 128. For example, the workload analyzing circuitry 308 can assign the first autonomous vehicle 116 an additional task including traveling to the fourth inventory storage location 110 to be loaded with the third product 138. Thus, as a result of the additional task, the first autonomous vehicle 116 is loaded with the third product 138 of the second order in addition to the first product 122 of the first order before traveling to the order assembly area 114.

In the above example, the workload analyzing circuitry 308 determines that the first autonomous vehicle 116 can be used to carry a product of the second order and arrive at the order assembly area 114 such that the arrival time of the first autonomous vehicle 116 at the order assembly area 114 is maintained or occurs within a threshold time of the estimated arrive time for the third user 128 completing the assigned task for the first order (i.e., delivering the second product 125 of the first order to the order assembly area 114). Therefore, the workload analyzing circuitry 308 determines that the autonomous vehicle 116 should be assigned the additional task.

In some examples, the workload analyzing circuitry 308 executes the task selection model(s) 322 to identify additional task(s) to be performed by the user(s) 120, 126, 128 who are retrieving products without the assistance of an autonomous vehicle 116, 118, 200 to optimize employee workloads. For instance, continuing the foregoing example, as a result of the monitoring performed by the workload monitoring circuitry 306, the workload analyzing circuitry 308 can determine that the third user 128 is expected to arrive at the order assembly area 114 ahead of the previously expected arrival time for the third user 128 (e.g., based on the task performance estimation data 320). The workload analyzing circuitry 308 executes the task selection model(s) 514 to identify tasks for the third user 128 to perform while maintaining a substantially synchronized arrival time at the order assembly area 114 with the first autonomous vehicle 116. For example, the workload analyzing circuitry 308 can assign an additional task to the third user 128 such as counting inventory proximate to a location in the warehouse from which the third user 128 retrieved the second product 125. In some examples, the instructions can instruct the third user 128 to arrive at the order assembly area 114 at a particular time. The instructions generated by the workload analyzing circuitry 308 including the additional tasks can be transmitted to the user workload application 214 on the user device 130, 132, 134, 202 associated with the corresponding users 120, 126, 128 via the user device interface circuitry 302. The instructions can cause the user workload application 214 to present alerts (e.g., visual alerts, audio alerts) for presentation to the user.

In some examples, the workload control circuitry 124 includes means for interfacing with an autonomous vehicle. For example, the means for vehicle interfacing may be implemented by the vehicle interface circuitry 300. In some examples, the vehicle interface circuitry 300 may be instantiated by processor circuitry such as the example processor circuitry 512 of FIG. 5. For instance, the vehicle interface circuitry 300 may be instantiated by the example general purpose processor circuitry 600 of FIG. 6 executing machine executable instructions such as that implemented by at least blocks 404, 422 of FIG. 4. In some examples, the vehicle interface circuitry 300 may be instantiated by hardware logic circuitry, which may be implemented by an ASIC or the FPGA circuitry 700 of FIG. 7 structured to perform operations corresponding to the machine readable instructions. Additionally or alternatively, the vehicle interface circuitry 300 may be instantiated by any other combination of hardware, software, and/or firmware. For example, the vehicle interface circuitry 300 may be implemented by at least one or more hardware circuits (e.g., processor circuitry, discrete and/or integrated analog and/or digital circuitry, an FPGA, an Application Specific Integrated Circuit (ASIC), a comparator, an operational-amplifier (op-amp), a logic circuit, etc.) structured to execute some or all of the machine readable instructions and/or to perform some or all of the operations corresponding to the machine readable instructions without executing software or firmware, but other structures are likewise appropriate.

In some examples, the workload control circuitry 124 includes means for interfacing with a user device. For example, the means for user device interfacing may be implemented by the user device interface circuitry 300. In some examples, the user device interface circuitry 302 may be instantiated by processor circuitry such as the example processor circuitry 512 of FIG. 5. For instance, the user device interface circuitry 302 may be instantiated by the example general purpose processor circuitry 600 of FIG. 6 executing machine executable instructions such as that implemented by at least block 404 of FIG. 4. In some examples, the user device interface circuitry 302 may be instantiated by hardware logic circuitry, which may be implemented by an ASIC or the FPGA circuitry 700 of FIG. 7 structured to perform operations corresponding to the machine readable instructions. Additionally or alternatively, the user device interface circuitry 302 may be instantiated by any other combination of hardware, software, and/or firmware. For example, the user device interface circuitry 302 may be implemented by at least one or more hardware circuits (e.g., processor circuitry, discrete and/or integrated analog and/or digital circuitry, an FPGA, an Application Specific Integrated Circuit (ASIC), a comparator, an operational-amplifier (op-amp), a logic circuit, etc.) structured to execute some or all of the machine readable instructions and/or to perform some or all of the operations corresponding to the machine readable instructions without executing software or firmware, but other structures are likewise appropriate.

In some examples, the workload control circuitry 124 includes means for interfacing with an order management engine. For example, the means for order management engine interfacing may be implemented by the order engine interface circuitry 303. In some examples, the order engine interface circuitry 303 may be instantiated by processor circuitry such as the example processor circuitry 512 of FIG. 5. For instance, the order engine interface circuitry 303 may be instantiated by the example general purpose processor circuitry 600 of FIG. 6 executing machine executable instructions such as that implemented by at least block 402 of FIG. 4. In some examples, the order engine interface circuitry 303 may be instantiated by hardware logic circuitry, which may be implemented by an ASIC or the FPGA circuitry 700 of FIG. 7 structured to perform operations corresponding to the machine readable instructions. Additionally or alternatively, the order engine interface circuitry 303 may be instantiated by any other combination of hardware, software, and/or firmware. For example, the order engine interface circuitry 303 may be implemented by at least one or more hardware circuits (e.g., processor circuitry, discrete and/or integrated analog and/or digital circuitry, an FPGA, an Application Specific Integrated Circuit (ASIC), a comparator, an operational-amplifier (op-amp), a logic circuit, etc.) structured to execute some or all of the machine readable instructions and/or to perform some or all of the operations corresponding to the machine readable instructions without executing software or firmware, but other structures are likewise appropriate.

In some examples, the workload control circuitry 124 includes means for allocating orders. For example, the means for order allocating may be implemented by the order allocation circuitry 304. In some examples, the order allocation circuitry 304 may be instantiated by processor circuitry such as the example processor circuitry 512 of FIG. 5. For instance, the order allocation circuitry 304 may be instantiated by the example general purpose processor circuitry 600 of FIG. 6 executing machine executable instructions such as that implemented by at least blocks 404, 406, 426 of FIG. 4. In some examples, the order allocation circuitry 304 may be instantiated by hardware logic circuitry, which may be implemented by an ASIC or the FPGA circuitry 700 of FIG. 7 structured to perform operations corresponding to the machine readable instructions. Additionally or alternatively, order allocation circuitry 304 may be instantiated by any other combination of hardware, software, and/or firmware. For example, the order allocation circuitry 304 may be implemented by at least one or more hardware circuits (e.g., processor circuitry, discrete and/or integrated analog and/or digital circuitry, an FPGA, an Application Specific Integrated Circuit (ASIC), a comparator, an operational-amplifier (op-amp), a logic circuit, etc.) structured to execute some or all of the machine readable instructions and/or to perform some or all of the operations corresponding to the machine readable instructions without executing software or firmware, but other structures are likewise appropriate.

In some examples, the workload control circuitry 124 includes means for monitoring workloads. For example, the means for workload monitoring may be implemented by the workload monitoring circuitry 306. In some examples, the workload monitoring circuitry 306 may be instantiated by processor circuitry such as the example processor circuitry 512 of FIG. 5. For instance, the workload monitoring circuitry 306 may be instantiated by the example general purpose processor circuitry 600 of FIG. 6 executing machine executable instructions such as that implemented by at least blocks 408, 410 of FIG. 4. In some examples, the workload monitoring circuitry 306 may be instantiated by hardware logic circuitry, which may be implemented by an ASIC or the FPGA circuitry 700 of FIG. 7 structured to perform operations corresponding to the machine readable instructions. Additionally or alternatively, workload monitoring circuitry 306 may be instantiated by any other combination of hardware, software, and/or firmware. For example, the workload monitoring circuitry 306 may be implemented by at least one or more hardware circuits (e.g., processor circuitry, discrete and/or integrated analog and/or digital circuitry, an FPGA, an Application Specific Integrated Circuit (ASIC), a comparator, an operational-amplifier (op-amp), a logic circuit, etc.) structured to execute some or all of the machine readable instructions and/or to perform some or all of the operations corresponding to the machine readable instructions without executing software or firmware, but other structures are likewise appropriate.

In some examples, the workload control circuitry 124 includes means for analyzing workloads. For example, the means for workload analyzing may be implemented by the workload analyzing circuitry 308. In some examples, the workload analyzing circuitry 308 may be instantiated by processor circuitry such as the example processor circuitry 512 of FIG. 5. For instance, the workload analyzing circuitry 308 may be instantiated by the example general purpose processor circuitry 600 of FIG. 6 executing machine executable instructions such as that implemented by at least blocks 412, 414, 416, 418, 420, 422, 424 of FIG. 4. In some examples, the workload analyzing circuitry 308 may be instantiated by hardware logic circuitry, which may be implemented by an ASIC or the FPGA circuitry 700 of FIG. 7 structured to perform operations corresponding to the machine readable instructions. Additionally or alternatively, workload analyzing circuitry 308 may be instantiated by any other combination of hardware, software, and/or firmware. For example, the workload analyzing circuitry 308 may be implemented by at least one or more hardware circuits (e.g., processor circuitry, discrete and/or integrated analog and/or digital circuitry, an FPGA, an Application Specific Integrated Circuit (ASIC), a comparator, an operational-amplifier (op-amp), a logic circuit, etc.) structured to execute some or all of the machine readable instructions and/or to perform some or all of the operations corresponding to the machine readable instructions without executing software or firmware, but other structures are likewise appropriate.

While an example manner of implementing the workload control circuitry 124 of FIG. 1 is illustrated in FIG. 3, one or more of the elements, processes, and/or devices illustrated in FIG. 3 may be combined, divided, re-arranged, omitted, eliminated, and/or implemented in any other way. Further, the example vehicle interface circuitry 300, the example user device interface circuitry 302, the example order engine interface circuitry 303, the example order allocation circuitry 304, the example workload monitoring circuitry 306, the example workload analyzing circuitry 308, and/or, more generally, the example workload control circuitry 124 of FIG. 1, may be implemented by hardware alone or by hardware in combination with software and/or firmware. Thus, for example, any of the example vehicle interface circuitry 300, the example user device interface circuitry 302, the example order engine interface circuitry 303, the example order allocation circuitry 304, the example workload monitoring circuitry 306, the example workload analyzing circuitry 308, and/or, more generally, the example workload control circuitry 124, could be implemented by processor circuitry, analog circuit(s), digital circuit(s), logic circuit(s), programmable processor(s), programmable microcontroller(s), graphics processing unit(s) (GPU(s)), digital signal processor(s) (DSP(s)), application specific integrated circuit(s) (ASIC(s)), programmable logic device(s) (PLD(s)), and/or field programmable logic device(s) (FPLD(s)) such as Field Programmable Gate Arrays (FPGAs). Further still, the example workload control circuitry 124 of FIG. 1 may include one or more elements, processes, and/or devices in addition to, or instead of, those illustrated in FIG. 3, and/or may include more than one of any or all of the illustrated elements, processes, and devices.

Figure 4:
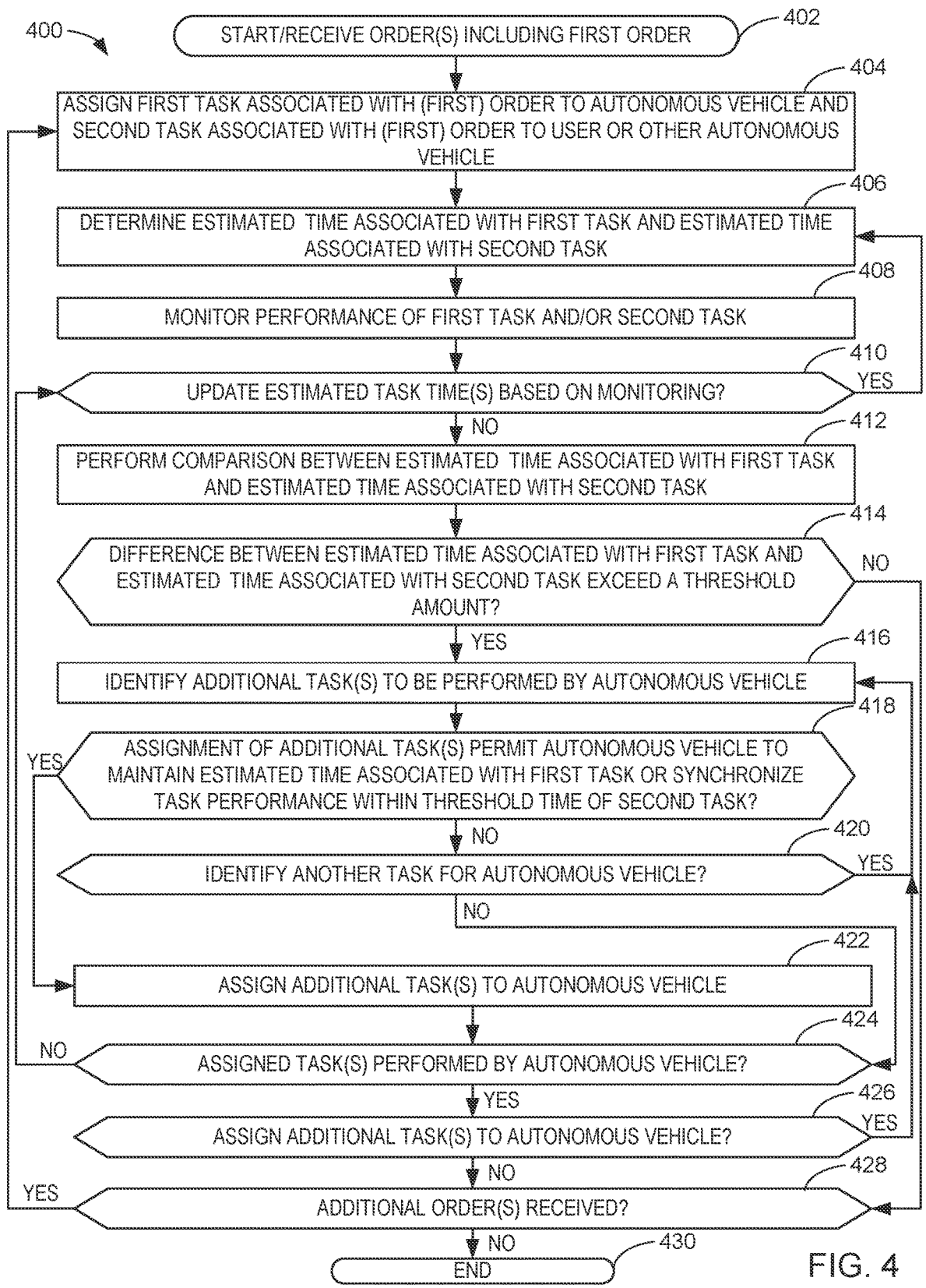
FIG. 4 is a flowchart representative of example machine readable instructions and/or example operations that may be executed by example processor circuitry to implement the example workload control circuitry of FIG. 3.

A flowchart representative of example hardware logic circuitry, machine readable instructions, hardware implemented state machines, and/or any combination thereof for implementing the workload control circuitry 124 of FIG. 3 is shown in FIG. 4. The machine readable instructions may be one or more executable programs or portion(s) of an executable program for execution by processor circuitry, such as the processor circuitry 512 shown in the example processor platform 500 discussed below in connection with FIG. 5 and/or the example processor circuitry discussed below in connection with FIGS. 6 and/or 7. The program may be embodied in software stored on one or more non-transitory computer readable storage media such as a compact disk (CD), a floppy disk, a hard disk drive (HDD), a solid-state drive (SSD), a digital versatile disk (DVD), a Blu-ray disk, a volatile memory (e.g., Random Access Memory (RAM) of any type, etc.), or a non-volatile memory (e.g., electrically erasable programmable read-only memory (EEPROM), FLASH memory, an HDD, an SSD, etc.) associated with processor circuitry located in one or more hardware devices, but the entire program and/or parts thereof could alternatively be executed by one or more hardware devices other than the processor circuitry and/or embodied in firmware or dedicated hardware. The machine readable instructions may be distributed across multiple hardware devices and/or executed by two or more hardware devices (e.g., a server and a client hardware device). For example, the client hardware device may be implemented by an endpoint client hardware device (e.g., a hardware device associated with a user) or an intermediate client hardware device (e.g., a radio access network (RAN)) gateway that may facilitate communication between a server and an endpoint client hardware device). Similarly, the non-transitory computer readable storage media may include one or more mediums located in one or more hardware devices. Further, although the example program is described with reference to the flowchart illustrated in FIG. 4, many other methods of implementing the example workload control circuitry 124 may alternatively be used. For example, the order of execution of the blocks may be changed, and/or some of the blocks described may be changed, eliminated, or combined. Additionally or alternatively, any or all of the blocks may be implemented by one or more hardware circuits (e.g., processor circuitry, discrete and/or integrated analog and/or digital circuitry, an FPGA, an ASIC, a comparator, an operational-amplifier (op-amp), a logic circuit, etc.) structured to perform the corresponding operation without executing software or firmware. The processor circuitry may be distributed in different network locations and/or local to one or more hardware devices (e.g., a single-core processor (e.g., a single core central processor unit (CPU)), a multi-core processor (e.g., a multi-core CPU), etc.) in a single machine, multiple processors distributed across multiple servers of a server rack, multiple processors distributed across one or more server racks, a CPU and/or a FPGA located in the same package (e.g., the same integrated circuit (IC) package or in two or more separate housings, etc.).

The machine readable instructions described herein may be stored in one or more of a compressed format, an encrypted format, a fragmented format, a compiled format, an executable format, a packaged format, etc. Machine readable instructions as described herein may be stored as data or a data structure (e.g., as portions of instructions, code, representations of code, etc.) that may be utilized to create, manufacture, and/or produce machine executable instructions. For example, the machine readable instructions may be fragmented and stored on one or more storage devices and/or computing devices (e.g., servers) located at the same or different locations of a network or collection of networks (e.g., in the cloud, in edge devices, etc.). The machine readable instructions may require one or more of installation, modification, adaptation, updating, combining, supplementing, configuring, decryption, decompression, unpacking, distribution, reassignment, compilation, etc., in order to make them directly readable, interpretable, and/or executable by a computing device and/or other machine. For example, the machine readable instructions may be stored in multiple parts, which are individually compressed, encrypted, and/or stored on separate computing devices, wherein the parts when decrypted, decompressed, and/or combined form a set of machine executable instructions that implement one or more operations that may together form a program such as that described herein.

In another example, the machine readable instructions may be stored in a state in which they may be read by processor circuitry, but require addition of a library (e.g., a dynamic link library (DLL)), a software development kit (SDK), an application programming interface (API), etc., in order to execute the machine readable instructions on a particular computing device or other device. In another example, the machine readable instructions may need to be configured (e.g., settings stored, data input, network addresses recorded, etc.) before the machine readable instructions and/or the corresponding program(s) can be executed in whole or in part. Thus, machine readable media, as used herein, may include machine readable instructions and/or program(s) regardless of the particular format or state of the machine readable instructions and/or program(s) when stored or otherwise at rest or in transit.

The machine readable instructions described herein can be represented by any past, present, or future instruction language, scripting language, programming language, etc. For example, the machine readable instructions may be represented using any of the following languages: C, C++, Java, C#, Perl, Python, JavaScript, HyperText Markup Language (HTML), Structured Query Language (SQL), Swift, etc.

As mentioned above, the example operations of FIG. 4 may be implemented using executable instructions (e.g., computer and/or machine readable instructions) stored on one or more non-transitory computer and/or machine readable media such as optical storage devices, magnetic storage devices, an HDD, a flash memory, a read-only memory (ROM), a CD, a DVD, a cache, a RAM of any type, a register, and/or any other storage device or storage disk in which information is stored for any duration (e.g., for extended time periods, permanently, for brief instances, for temporarily buffering, and/or for caching of the information). As used herein, the terms non-transitory computer readable medium and non-transitory computer readable storage medium are expressly defined to include any type of computer readable storage device and/or storage disk and to exclude propagating signals and to exclude transmission media.

"Including" and "comprising" (and all forms and tenses thereof) are used herein to be open ended terms. Thus, whenever a claim employs any form of "include" or "comprise" (e.g., comprises, includes, comprising, including, having, etc.) as a preamble or within a claim recitation of any kind, it is to be understood that additional elements, terms, etc., may be present without falling outside the scope of the corresponding claim or recitation. As used herein, when the phrase "at least" is used as the transition term in, for example, a preamble of a claim, it is open-ended in the same manner as the term "comprising" and "including" are open ended. The term "and/or" when used, for example, in a form such as A, B, and/or C refers to any combination or subset of A, B, C such as (1) A alone, (2) B alone, (3) C alone, (4) A with B, (5) A with C, (6) B with C, or (7) A with B and with C. As used herein in the context of describing structures, components, items, objects and/or things, the phrase "at least one of A and B" is intended to refer to implementations including any of (1) at least one A, (2) at least one B, or (3) at least one A and at least one B. Similarly, as used herein in the context of describing structures, components, items, objects and/or things, the phrase "at least one of A or B" is intended to refer to implementations including any of (1) at least one A, (2) at least one B, or (3) at least one A and at least one B. As used herein in the context of describing the performance or execution of processes, instructions, actions, activities and/or steps, the phrase "at least one of A and B" is intended to refer to implementations including any of (1) at least one A, (2) at least one B, or (3) at least one A and at least one B. Similarly, as used herein in the context of describing the performance or execution of processes, instructions, actions, activities and/or steps, the phrase "at least one of A or B" is intended to refer to implementations including any of (1) at least one A, (2) at least one B, or (3) at least one A and at least one B.

As used herein, singular references (e.g., "a," "an," "first," "second," etc.) do not exclude a plurality. The term "a" or "an" object, as used herein, refers to one or more of that object. The terms "a" (or "an"), "one or more," and "at least one" are used interchangeably herein. Furthermore, although individually listed, a plurality of means, elements or method actions may be implemented by, e.g., the same entity or object. Additionally, although individual features may be included in different examples or claims, these may possibly be combined, and the inclusion in different examples or claims does not imply that a combination of features is not feasible and/or advantageous.

FIG. 4 is a flowchart representative of example machine readable instructions and/or example operations 400 that may be executed and/or instantiated by processor circuitry to manage workload(s) or task(s) assigned to the autonomous vehicle(s) 116, 118, 200 in the warehouse 102. The machine readable instructions and/or the operations 400 of FIG. 4 begin at block 402, at which the order engine interface circuitry 303 receives order(s) from the management engine 220 including a first order. At block 404, the order allocation circuitry 304 analyzes the first order to determine the order status data 312 for the first order and assign tasks in connection with the first order. In particular, at block 404, the order allocation circuitry 304 assigns a first task associated with the first order to one of the autonomous vehicles 116, 118, 200 of FIG. 1 and a second task to another autonomous vehicle 116, 118, 200 or a user 120, 126, 128 to perform (i.e., without assistance of the autonomous vehicles 116, 118, 200). The first task can include delivery of a first product of the first order to the order assembly area 114 of the warehouse 102 via the autonomous vehicle 116, 118, 200 and the second task can include delivery of a second product of the first order to the order assembly area 114 by the user 120, 126, 128 (e.g., manually carrying the product). Instructions including the assigned tasks can be output to the vehicle control circuitry 210 via the vehicle interface circuitry 300 and the user workload application 214 via the user device interface circuitry 302.

At block 406, the order allocation circuitry 304 executes the task performance estimation model(s) 316 to determine expected times associated with performance of the first task and the second task. For example, the order allocation circuitry 304 determines an expected arrival time of the autonomous vehicle 116, 118, 200 at the order assembly area 114 and an expected arrival time of the user 120, 126, 128 at the order assembly area 114.

At block 408, the workload monitoring circuitry 306 monitors performance of the first task and/or the second task. For example, the workload monitoring circuitry 306 can track activity of the autonomous vehicle 116, 118, 200 based on the vehicle location data 309. The workload monitoring circuitry 306 can track activity of the user 120, 126, 128 based on the user input data 311.

At block 410, the workload monitoring circuitry 306 determines if the estimated task times (e.g., estimated arrival times at the order assembly area 114) should be updated based on the activity monitoring. The order allocation circuitry 304 updates the estimated time(s) associated with the task(s) based on the monitoring (block 406).

At block 412, the workload analyzing circuitry 308 performs a comparison between the estimated time associated with the first task and the estimated time associated with the second task. For example, the workload analyzing circuitry 308 can compare the estimated arrival time of the first autonomous vehicle at the order assembly area 114 with the first product of the first order and the estimated arrival time of the user 120, 126, 128 at the order assembly area 114 with the second product of the first order.

At block 414, the workload analyzing circuitry 308 determines if a difference between the estimated time associated with the first task and the expected time associated with the second task exceeds a threshold amount. If, for instance, the workload analyzing circuitry 308 determines that the difference between the estimated arrival times exceeds a threshold difference such that the autonomous vehicle 116, 118, 200 is expected to arrive at the order assembly area 114 beyond a threshold amount of a time associated with the second task, then at block 416, the workload analyzing circuitry 308 executes the task selection model(s) 322 to identify additional task(s) to be assigned to the autonomous vehicle 116, 118, 200.

At block 418, the workload analyzing circuitry 308 determines if assigning the additional task(s) will permit the autonomous vehicle to maintain the estimated time associated with the first task or to synchronize task performance within a threshold of the estimated time associated with the second task (e.g., arrival of the products carried by the autonomous vehicle 116, 118, 200 and the user 120, 126, 128 at the order assembly area 114 within a threshold time of each other). For example, the workload analyzing circuitry 308 can determine an estimated time to complete the additional tasks relative to the expected arrival time associated with the second task by the user 120, 126, 128. If, at block 420, the additional task(s) will not permit the autonomous vehicle to maintain the estimated time associated with the first task or to synchronize task performance within a threshold of the estimated time associated with the second task, then, in some examples, the workload analyzing circuitry 308 executes the task selection model(s) 322 to identify other task(s).

If the additional task(s) will permit the autonomous vehicle to maintain the estimated time associated with the first task or to synchronize task performance within a threshold of the estimated time associated with the second task, then the workload analyzing circuitry 308 assigns the additional task(s) to the autonomous vehicle 116, 118, 200 via the vehicle interface circuitry 300 at block 422.

At block 424, the workload analyzing circuitry 308 determines if the task(s) assigned to the autonomous vehicle 116, 118, 200 have been performed. If the assigned task(s) have not been performed, then control proceeds to block 410 to update the estimated arrival times associated with the tasks. The example instructions of FIG. 4 end when the task(s) assigned to the autonomous vehicle 116, 118, 200 have been performed, no additional task(s) are to be assigned to the autonomous vehicle 116, 118, 200, and the order allocation circuitry 304 determines that no additional orders have been received (blocks 426, 428, 430).

Figure 5:
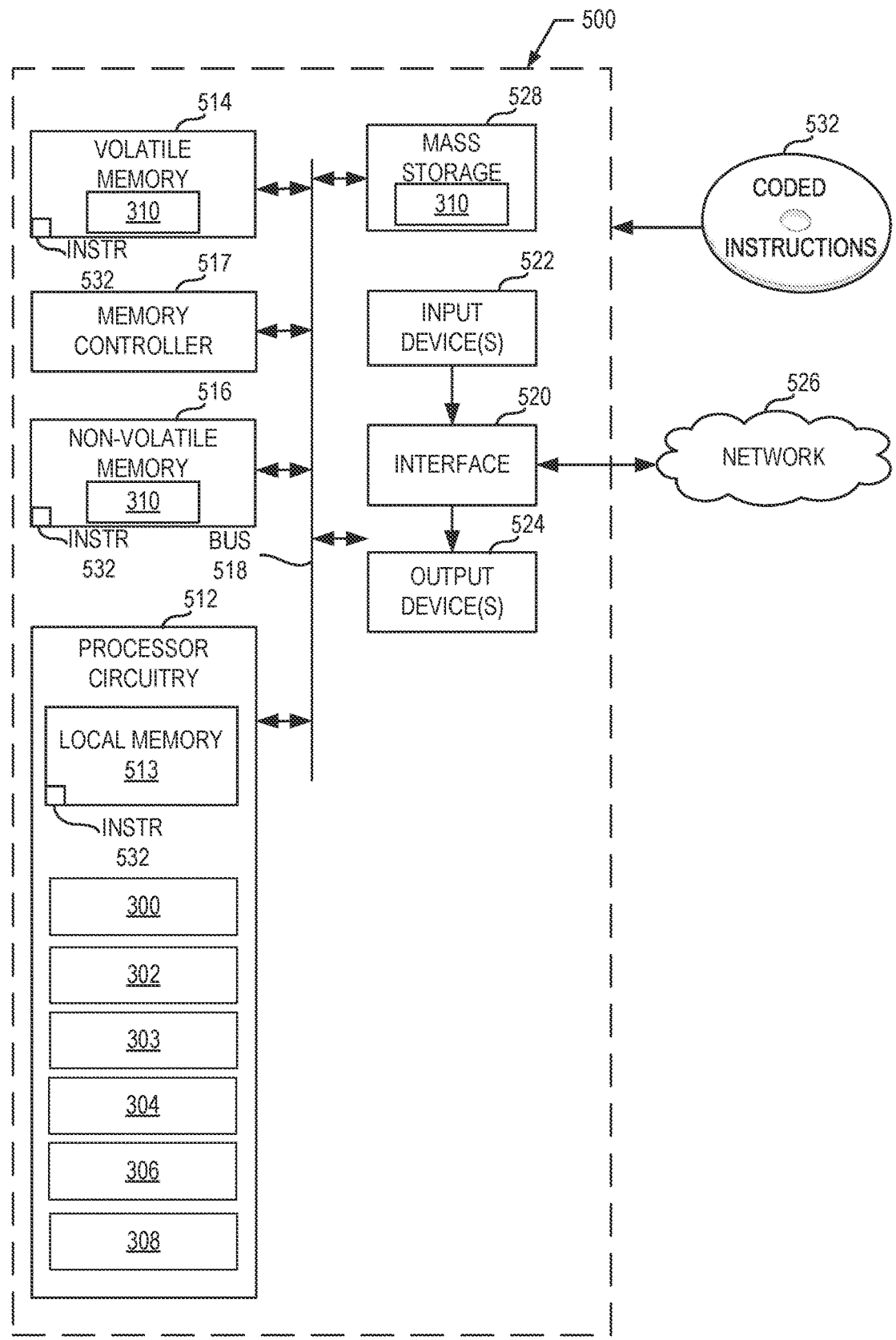
FIG. 5 is a block diagram of an example processing platform including processor circuitry structured to execute the example machine readable instructions and/or the example operations of FIG. 4 to implement the workload control circuitry of FIG. 3.

FIG. 5 is a block diagram of an example processor platform 500 structured to execute and/or instantiate the machine readable instructions and/or the operations of FIG. 4 to implement the workload control circuitry 124 of FIG. 3. The processor platform 500 can be, for example, a server, a personal computer, a workstation, a self-learning machine (e.g., a neural network), a mobile device (e.g., a cell phone, a smart phone, a tablet such as an iPad™), a personal digital assistant (PDA), an Internet appliance, or any other type of computing device.

The processor platform 500 of the illustrated example includes processor circuitry 512. The processor circuitry 512 of the illustrated example is hardware. For example, the processor circuitry 512 can be implemented by one or more integrated circuits, logic circuits, FPGAs, microprocessors, CPUs, GPUs, DSPs, and/or microcontrollers from any desired family or manufacturer. The processor circuitry 512 may be implemented by one or more semiconductor based (e.g., silicon based) devices. In this example, the processor circuitry 512 implements the example vehicle interface circuitry 300, the example user device interface circuitry 302, the example order engine interface circuitry 303, the example order allocation circuitry 304, the example workload monitoring circuitry 306, and the example workload analyzing circuitry 308.

The processor circuitry 512 of the illustrated example includes a local memory 513 (e.g., a cache, registers, etc.). The processor circuitry 512 of the illustrated example is in communication with a main memory including a volatile memory 514 and a non-volatile memory 516 by a bus 518. The volatile memory 514 may be implemented by Synchronous Dynamic Random Access Memory (SDRAM), Dynamic Random Access Memory (DRAM), RAMBUS® Dynamic Random Access Memory (RDRAM®), and/or any other type of RAM device. The non-volatile memory 516 may be implemented by flash memory and/or any other desired type of memory device. Access to the main memory 514, 516 of the illustrated example is controlled by a memory controller 517.

The processor platform 500 of the illustrated example also includes interface circuitry 520. The interface circuitry 520 may be implemented by hardware in accordance with any type of interface standard, such as an Ethernet interface, a universal serial bus (USB) interface, a Bluetooth® interface, a near field communication (NFC) interface, a Peripheral Component Interconnect (PCI) interface, and/or a Peripheral Component Interconnect Express (PCIe) interface.

In the illustrated example, one or more input devices 522 are connected to the interface circuitry 520. The input device(s) 522 permit(s) a user to enter data and/or commands into the processor circuitry 512. The input device(s) 522 can be implemented by, for example, an audio sensor, a microphone, a camera (still or video), a keyboard, a button, a mouse, a touchscreen, a track-pad, a trackball, an isopoint device, and/or a voice recognition system.

One or more output devices 524 are also connected to the interface circuitry 520 of the illustrated example. The output device(s) 524 can be implemented, for example, by display devices (e.g., a light emitting diode (LED), an organic light emitting diode (OLED), a liquid crystal display (LCD), a cathode ray tube (CRT) display, an in-place switching (IPS) display, a touchscreen, etc.), a tactile output device, a printer, and/or speaker. The interface circuitry 520 of the illustrated example, thus, typically includes a graphics driver card, a graphics driver chip, and/or graphics processor circuitry such as a GPU.

The interface circuitry 520 of the illustrated example also includes a communication device such as a transmitter, a receiver, a transceiver, a modem, a residential gateway, a wireless access point, and/or a network interface to facilitate exchange of data with external machines (e.g., computing devices of any kind) by a network 526. The communication can be by, for example, an Ethernet connection, a digital subscriber line (DSL) connection, a telephone line connection, a coaxial cable system, a satellite system, a line-of-site wireless system, a cellular telephone system, an optical connection, etc.

The processor platform 500 of the illustrated example also includes one or more mass storage devices 528 to store software and/or data. Examples of such mass storage devices 528 include magnetic storage devices, optical storage devices, floppy disk drives, HDDs, CDs, Blu-ray disk drives, redundant array of independent disks (RAID) systems, solid state storage devices such as flash memory devices and/or SSDs, and DVD drives.

The machine executable instructions 532, which may be implemented by the machine readable instructions of FIG. 4, may be stored in the mass storage device 528, in the volatile memory 514, in the non-volatile memory 516, and/or on a removable non-transitory computer readable storage medium such as a CD or DVD.

Figure 6:
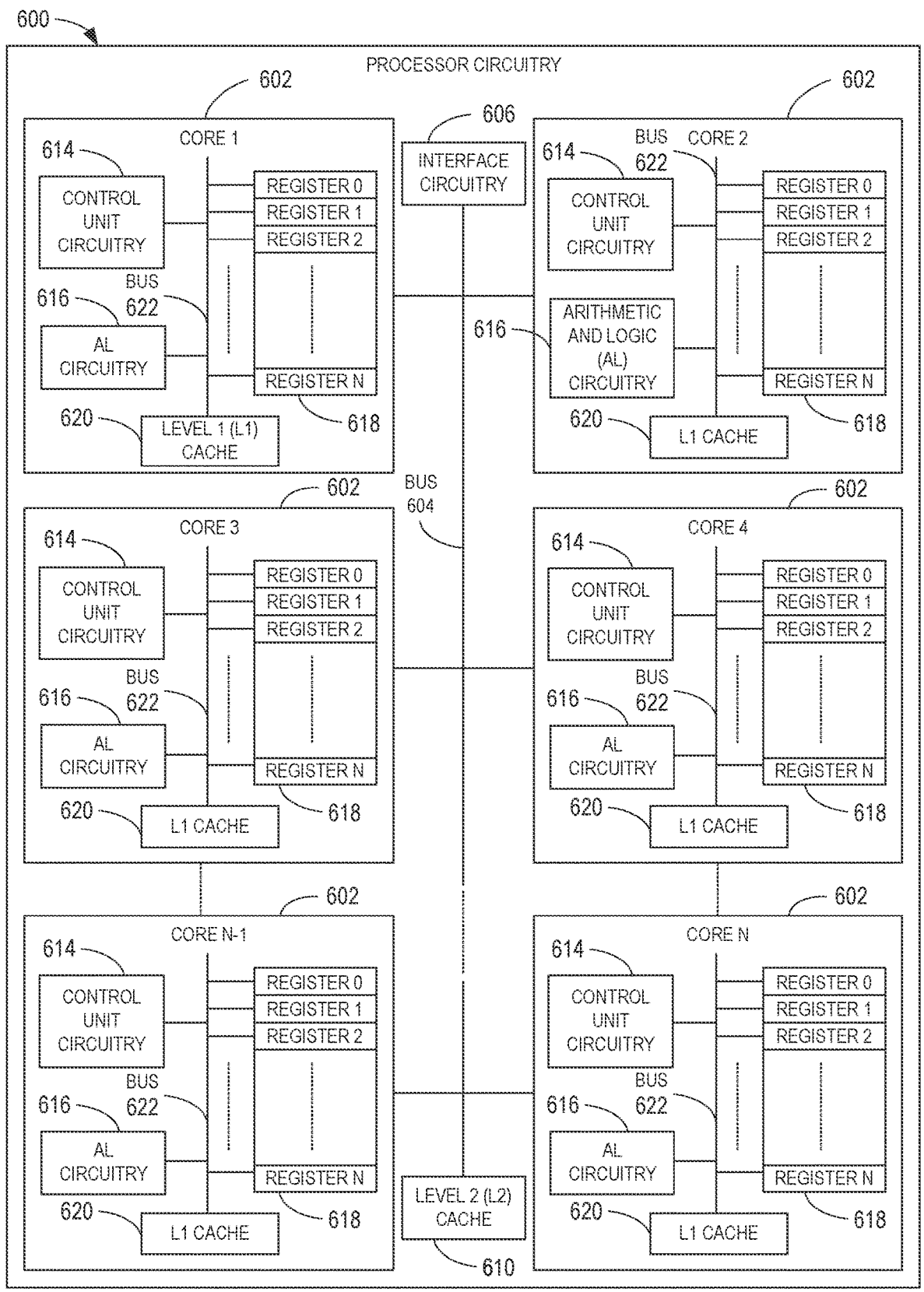
FIG. 6 is a block diagram of an example implementation of the processor circuitry of FIG. 4.

FIG. 6 is a block diagram of an example implementation of the processor circuitry 512 of FIG. 5. In this example, the processor circuitry 512 of FIG. 5 is implemented by a general purpose microprocessor 600. The general purpose microprocessor circuitry 600 executes some or all of the machine readable instructions of the flowchart of FIG. 4 to effectively instantiate the circuitry of FIG. 3 as logic circuits to perform the operations corresponding to those machine readable instructions. In some such examples, the circuitry of FIG. 3 is instantiated by the hardware circuits of the microprocessor 600 in combination with the instructions. For example, the microprocessor 600 may implement multi-core hardware circuitry such as a CPU, a DSP, a GPU, an XPU, etc. Although it may include any number of example cores 602 (e.g., 1 core), the microprocessor 600 of this example is a multi-core semiconductor device including N cores. The cores 602 of the microprocessor 600 may operate independently or may cooperate to execute machine readable instructions. For example, machine code corresponding to a firmware program, an embedded software program, or a software program may be executed by one of the cores 602 or may be executed by multiple ones of the cores 602 at the same or different times. In some examples, the machine code corresponding to the firmware program, the embedded software program, or the software program is split into threads and executed in parallel by two or more of the cores 602. The software program may correspond to a portion or all of the machine readable instructions and/or operations represented by the flowchart of FIG. 4.

The cores 602 may communicate by a first example bus 604. In some examples, the first bus 604 may implement a communication bus to effectuate communication associated with one(s) of the cores 602. For example, the first bus 604 may implement at least one of an Inter-Integrated Circuit (I2C) bus, a Serial Peripheral Interface (SPI) bus, a PCI bus, or a PCIe bus. Additionally or alternatively, the first bus 604 may implement any other type of computing or electrical bus. The cores 602 may obtain data, instructions, and/or signals from one or more external devices by example interface circuitry 606. The cores 602 may output data, instructions, and/or signals to the one or more external devices by the interface circuitry 606. Although the cores 602 of this example include example local memory 620 (e.g., Level 1 (L1) cache that may be split into an L1 data cache and an L1 instruction cache), the microprocessor 600 also includes example shared memory 610 that may be shared by the cores (e.g., Level 2 (L2_ cache)) for high-speed access to data and/or instructions. Data and/or instructions may be transferred (e.g., shared) by writing to and/or reading from the shared memory 610. The local memory 620 of each of the cores 602 and the shared memory 610 may be part of a hierarchy of storage devices including multiple levels of cache memory and the main memory (e.g., the main memory 514, 516 of FIG. 5). Typically, higher levels of memory in the hierarchy exhibit lower access time and have smaller storage capacity than lower levels of memory. Changes in the various levels of the cache hierarchy are managed (e.g., coordinated) by a cache coherency policy.

Each core 602 may be referred to as a CPU, DSP, GPU, etc., or any other type of hardware circuitry. Each core 602 includes control unit circuitry 614, arithmetic and logic (AL) circuitry (sometimes referred to as an ALU) 616, a plurality of registers 618, the L1 cache 620, and a second example bus 622. Other structures may be present. For example, each core 602 may include vector unit circuitry, single instruction multiple data (SIMD) unit circuitry, load/store unit (LSU) circuitry, branch/jump unit circuitry, floating-point unit (FPU) circuitry, etc. The control unit circuitry 614 includes semiconductor-based circuits structured to control (e.g., coordinate) data movement within the corresponding core 602. The AL circuitry 616 includes semiconductor-based circuits structured to perform one or more mathematic and/or logic operations on the data within the corresponding core 602. The AL circuitry 616 of some examples performs integer based operations. In other examples, the AL circuitry 616 also performs floating point operations. In yet other examples, the AL circuitry 616 may include first AL circuitry that performs integer based operations and second AL circuitry that performs floating point operations. In some examples, the AL circuitry 616 may be referred to as an Arithmetic Logic Unit (ALU). The registers 618 are semiconductor-based structures to store data and/or instructions such as results of one or more of the operations performed by the AL circuitry 616 of the corresponding core 602. For example, the registers 618 may include vector register(s), SIMD register(s), general purpose register(s), flag register(s), segment register(s), machine specific register(s), instruction pointer register(s), control register(s), debug register(s), memory management register(s), machine check register(s), etc. The registers 618 may be arranged in a bank as shown in FIG. 6. Alternatively, the registers 618 may be organized in any other arrangement, format, or structure including distributed throughout the core 602 to shorten access time. The second bus 622 may implement at least one of an I2C bus, a SPI bus, a PCI bus, or a PCIe bus.

Each core 602 and/or, more generally, the microprocessor 600 may include additional and/or alternate structures to those shown and described above. For example, one or more clock circuits, one or more power supplies, one or more power gates, one or more cache home agents (CHAs), one or more converged/common mesh stops (CMSs), one or more shifters (e.g., barrel shifter(s)) and/or other circuitry may be present. The microprocessor 600 is a semiconductor device fabricated to include many transistors interconnected to implement the structures described above in one or more integrated circuits (ICs) contained in one or more packages. The processor circuitry may include and/or cooperate with one or more accelerators. In some examples, accelerators are implemented by logic circuitry to perform certain tasks more quickly and/or efficiently than can be done by a general purpose processor. Examples of accelerators include ASICs and FPGAs such as those discussed herein. A GPU or other programmable device can also be an accelerator. Accelerators may be on-board the processor circuitry, in the same chip package as the processor circuitry and/or in one or more separate packages from the processor circuitry.

Figure 7:
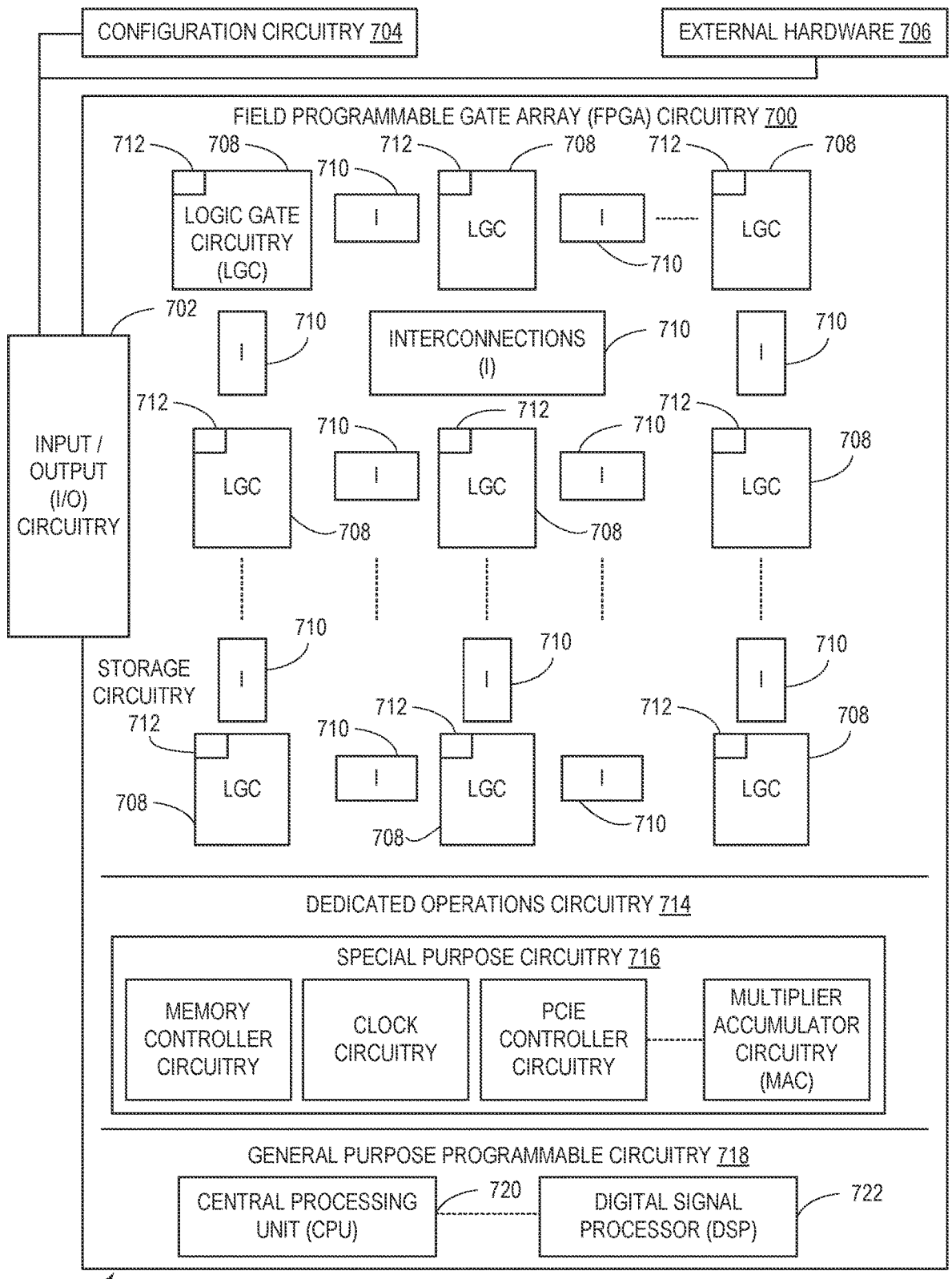
FIG. 7 is a block diagram of another example implementation of the processor circuitry of FIG. 5.

FIG. 7 is a block diagram of another example implementation of the processor circuitry 512 of FIG. 5. In this example, the processor circuitry 512 is implemented by FPGA circuitry 700. The FPGA circuitry 700 can be used, for example, to perform operations that could otherwise be performed by the example microprocessor 600 of FIG. 6 executing corresponding machine readable instructions. However, once configured, the FPGA circuitry 700 instantiates the machine readable instructions in hardware and, thus, can often execute the operations faster than they could be performed by a general purpose microprocessor executing the corresponding software.

More specifically, in contrast to the microprocessor 600 of FIG. 6 described above (which is a general purpose device that may be programmed to execute some or all of the machine readable instructions represented by the flowchart of FIG. 4 but whose interconnections and logic circuitry are fixed once fabricated), the FPGA circuitry 700 of the example of FIG. 7 includes interconnections and logic circuitry that may be configured and/or interconnected in different ways after fabrication to instantiate, for example, some or all of the machine readable instructions represented by the flowchart of FIG. 4. In particular, the FPGA 700 may be thought of as an array of logic gates, interconnections, and switches. The switches can be programmed to change how the logic gates are interconnected by the interconnections, effectively forming one or more dedicated logic circuits (unless and until the FPGA circuitry 700 is reprogrammed). The configured logic circuits enable the logic gates to cooperate in different ways to perform different operations on data received by input circuitry. Those operations may correspond to some or all of the software represented by the flowchart of FIG. 4. As such, the FPGA circuitry 700 may be structured to effectively instantiate some or all of the machine readable instructions of the flowchart of FIG. 4 as dedicated logic circuits to perform the operations corresponding to those software instructions in a dedicated manner analogous to an ASIC. Therefore, the FPGA circuitry 700 may perform the operations corresponding to the some or all of the machine readable instructions of FIG. 4 faster than the general purpose microprocessor can execute the same.

In the example of FIG. 7, the FPGA circuitry 700 is structured to be programmed (and/or reprogrammed one or more times) by an end user by a hardware description language (HDL) such as Verilog. The FPGA circuitry 700 of FIG. 7, includes example input/output (I/O) circuitry 702 to obtain and/or output data to/from example configuration circuitry 704 and/or external hardware (e.g., external hardware circuitry) 706. For example, the configuration circuitry 704 may implement interface circuitry that may obtain machine readable instructions to configure the FPGA circuitry 700, or portion(s) thereof. In some such examples, the configuration circuitry 704 may obtain the machine readable instructions from a user, a machine (e.g., hardware circuitry (e.g., programmed or dedicated circuitry) that may implement an Artificial Intelligence/Machine Learning (AI/ML) model to generate the instructions), etc. In some examples, the external hardware 706 may implement the microprocessor 600 of FIG. 6. The FPGA circuitry 700 also includes an array of example logic gate circuitry 708, a plurality of example configurable interconnections 710, and example storage circuitry 712. The logic gate circuitry 708 and interconnections 710 are configurable to instantiate one or more operations that may correspond to at least some of the machine readable instructions of FIG. 4 and/or other desired operations. The logic gate circuitry 708 shown in FIG. 7 is fabricated in groups or blocks. Each block includes semi-conductor-based electrical structures that may be configured into logic circuits. In some examples, the electrical structures include logic gates (e.g., And gates, Or gates, Nor gates, etc.) that provide basic building blocks for logic circuits. Electrically controllable switches (e.g., transistors) are present within each of the logic gate circuitry 708 to enable configuration of the electrical structures and/or the logic gates to form circuits to perform desired operations. The logic gate circuitry 708 may include other electrical structures such as look-up tables (LUTs), registers (e.g., flip-flops or latches), multiplexers, etc.

The interconnections 710 of the illustrated example are conductive pathways, traces, vias, or the like that may include electrically controllable switches (e.g., transistors) whose state can be changed by programming (e.g., using an HDL instruction language) to activate or deactivate one or more connections between one or more of the logic gate circuitry 708 to program desired logic circuits.

The storage circuitry 712 of the illustrated example is structured to store result(s) of the one or more of the operations performed by corresponding logic gates. The storage circuitry 712 may be implemented by registers or the like. In the illustrated example, the storage circuitry 712 is distributed amongst the logic gate circuitry 708 to facilitate access and increase execution speed.

The example FPGA circuitry 700 of FIG. 7 also includes example Dedicated Operations Circuitry 714. In this example, the Dedicated Operations Circuitry 714 includes special purpose circuitry 716 that may be invoked to implement commonly used functions to avoid the need to program those functions in the field. Examples of such special purpose circuitry 716 include memory (e.g., DRAM) controller circuitry, PCIe controller circuitry, clock circuitry, transceiver circuitry, memory, and multiplier-accumulator circuitry. Other types of special purpose circuitry may be present. In some examples, the FPGA circuitry 700 may also include example general purpose programmable circuitry 718 such as an example CPU 720 and/or an example DSP 722. Other general purpose programmable circuitry 718 may additionally or alternatively be present such as a GPU, an XPU, etc., that can be programmed to perform other operations.

Although FIGS. 6 and 7 illustrate two example implementations of the processor circuitry 512 of FIG. 5, many other approaches are contemplated. For example, as mentioned above, modern FPGA circuitry may include an onboard CPU, such as one or more of the example CPU 720 of FIG. 7. Therefore, the processor circuitry 512 of FIG. 5 may additionally be implemented by combining the example microprocessor 600 of FIG. 6 and the example FPGA circuitry 700 of FIG. 7. In some such hybrid examples, a first portion of the machine readable instructions represented by the flowchart of FIG. 4 may be executed by one or more of the cores 602 of FIG. 6, a second portion of the machine readable instructions represented by the flowchart of FIG. 4 may be executed by the FPGA circuitry 700 of FIG. 7, and/or a third portion of the machine readable instructions represented by the flowchart of FIG. 4 may be executed by an ASIC. It should be understood that some or all of the circuitry of FIG. 3 may, thus, be instantiated at the same or different times. Some or all of the circuitry may be instantiated, for example, in one or more threads executing concurrently and/or in series. Moreover, in some examples, some or all of the circuitry of FIG. 2 may be implemented within one or more virtual machines and/or containers executing on the microprocessor.

In some examples, the processor circuitry 512 of FIG. 5 may be in one or more packages. For example, the processor circuitry 600 of FIG. 6 and/or the FPGA circuitry 700 of FIG. 7 may be in one or more packages. In some examples, an XPU may be implemented by the processor circuitry 512 of FIG. 5, which may be in one or more packages. For example, the XPU may include a CPU in one package, a DSP in another package, a GPU in yet another package, and an FPGA in still yet another package.

Figure 8:
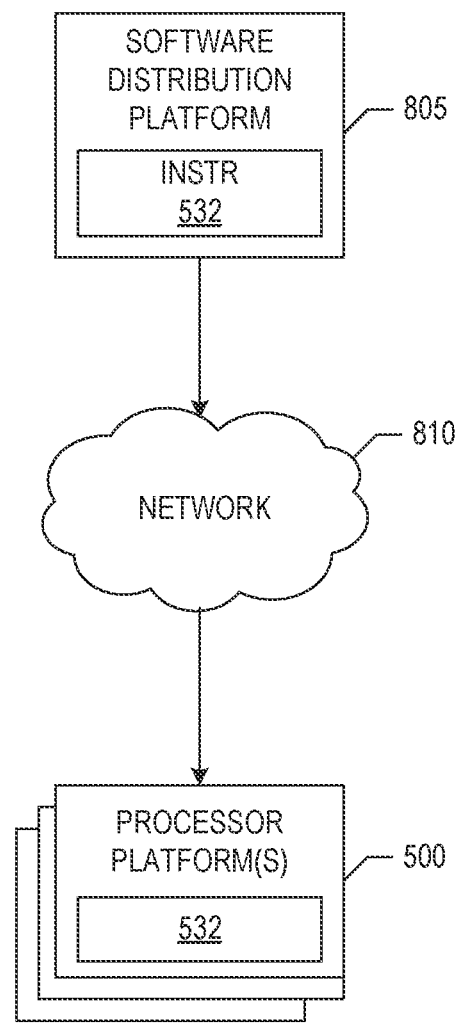
FIG. 8 is a block diagram of an example software distribution platform (e.g., one or more servers) to distribute software (e.g., software corresponding to the example machine readable instructions of FIG. 4) to client devices associated with end users and/or consumers (e.g., for license, sale, and/or use), retailers (e.g., for sale, re-sale, license, and/or sub-license), and/or original equipment manufacturers (OEMs) (e.g., for inclusion in products to be distributed to, for example, retailers and/or to other end users such as direct buy customers).

A block diagram illustrating an example software distribution platform 805 to distribute software such as the example machine readable instructions 532 of FIG. 5 to hardware devices owned and/or operated by third parties is illustrated in FIG. 8. The example software distribution platform 805 may be implemented by any computer server, data facility, cloud service, etc., capable of storing and transmitting software to other computing devices. The third parties may be customers of the entity owning and/or operating the software distribution platform 805. For example, the entity that owns and/or operates the software distribution platform 805 may be a developer, a seller, and/or a licensor of software such as the example machine readable instructions 532 of FIG. 5. The third parties may be consumers, users, retailers, OEMs, etc., who purchase and/or license the software for use and/or re-sale and/or sub-licensing. In the illustrated example, the software distribution platform 805 includes one or more servers and one or more storage devices. The storage devices store the machine readable instructions 532, which may correspond to the example machine readable instructions 400 of FIG. 4, as described above. The one or more servers of the example software distribution platform 805 are in communication with a network 810, which may correspond to any one or more of the Internet and/or any of the example networks 526 described above. In some examples, the one or more servers are responsive to requests to transmit the software to a requesting party as part of a commercial transaction. Payment for the delivery, sale, and/or license of the software may be handled by the one or more servers of the software distribution platform and/or by a third party payment entity. The servers enable purchasers and/or licensors to download the machine readable instructions 532 from the software distribution platform 805. For example, the software, which may correspond to the example machine readable instructions 400 of FIG. 4, may be downloaded to the example processor platform 500, which is to execute the machine readable instructions 532 to implement the workload control circuitry 124. In some example, one or more servers of the software distribution platform 805 periodically offer, transmit, and/or force updates to the software (e.g., the example machine readable instructions 532 of FIG. 5) to ensure improvements, patches, updates, etc., are distributed and applied to the software at the end user devices.

From the foregoing, it will be appreciated that example systems, methods, apparatus, and articles of manufacture have been disclosed that manage workload(s) or task(s) assigned to autonomous vehicle(s) to optimize use of the autonomous vehicle(s) in examples which, for instance, tasks(s) associated with an order are split between an autonomous vehicle and a user (e.g., warehouse personnel performing a task without the assistance of the autonomous vehicle). Examples disclosed herein monitor performance of the tasks by the autonomous vehicle(s) and the user(s) to determine (e.g., estimate, predict) arrival times associated with the task(s) (e.g., delivery of a product to a packing area of the warehouse). Examples disclosed herein determine if additional task(s) can be performed by the autonomous vehicle(s) such that synchronization of the arrival times is substantially maintained. As a result, examples disclosed herein reduce idle times of the autonomous vehicle(s) while increasing performance of tasks in connection with order(s).

Example apparatus, systems, methods, and articles of manufacture for optimization of autonomous vehicle workloads are disclosed herein. Further examples and combinations thereof include the following:

Example 1 includes an example apparatus comprising at least one memory; instructions; and a processor to execute the instructions to determine an expected arrival time for an autonomous vehicle at a first location, the autonomous vehicle to deliver a first product to the first location in response to a first task assigned to the autonomous vehicle, the first product associated with a first order; perform a comparison between the expected arrival time for the autonomous vehicle and an expected arrival time associated with a second task; select a third task to be performed by the autonomous vehicle based on the comparison, the third task selected for having the autonomous vehicle arrive at the first location after performance of the third task within a threshold time of the expected arrival time; and instruct the autonomous vehicle to perform the third task.

Example 2 includes the apparatus of example 1, wherein the second task is associated with the autonomous vehicle or another autonomous vehicle.

Example 3 includes the apparatus of examples 1 or 2, wherein the processor is to identify the third task based on a distance of the autonomous vehicle from the first location and a location associated with the third task.

Example 4 includes the apparatus of any of examples 1-3, wherein the processor is to determine the expected arrival time for the autonomous vehicle at the first location based on reference delivery time data for the autonomous vehicle.

Example 5 includes the apparatus of any of examples 1-4, wherein the second task includes delivery of a second product to the first location and the processor is to determine the expected arrival time associated with the delivery of the second product at the first location based on reference delivery time data for the second task.

Example 6 includes the apparatus of any of examples 1-5, wherein the first location is associated with a warehouse and the processor is to determine that the performance of the third task will cause the autonomous vehicle to arrive at the first location within the threshold time of the expected arrival time of the autonomous vehicle at the first location based on traffic data for a plurality of autonomous vehicles in the warehouse.

Example 7 includes the apparatus of any of examples 1-6, wherein the processor is to predict an amount of time associated with performance of the third task and select the third task based on the predicted amount of time for the third task.

Example 8 includes the apparatus of any of examples 1-7, wherein the processor is to determine the expected arrival time for the autonomous vehicle at the first location based on one or more other orders assigned to the autonomous vehicle.

Example 9 includes the apparatus of any of examples 1-9, wherein the second task includes delivery of a second product to the first location and the processor is to select the third task for having the autonomous vehicle arrive at the first location after performance of the second task within a threshold time of the expected arrival time associated with the delivery of the second product.

Example 10 includes at least one non-transitory computer readable medium comprising instructions that, when executed, cause at least one processor to at least assign a first task to an autonomous vehicle in connection with a first order, the first order associated with one or more other tasks; monitor performance of the first task by the autonomous vehicle; identify a second task to be assigned to the autonomous vehicle based on the monitoring and the one or more other tasks associated with the first order, the second task associated with the first order or a second order; and assign the second task to the autonomous vehicle, the assignment of the second task based on the performance of the first task and the second task by the autonomous vehicle within a threshold time relative to the performance of the one or more other tasks.

Example 11 includes the at least one non-transitory computer readable medium of example 10, wherein the instructions, when executed, cause the at least one processor to determine an estimated time associated with performance of the first task by the autonomous vehicle; and identify the second task based on the estimated time.

Example 12 includes the at least one non-transitory computer readable medium of examples 10 or 11, wherein the instructions, when executed, cause the at least one processor to adjust the estimated time based on the monitoring.

Example 13 includes the at least one non-transitory computer readable medium of any of examples 10-12, wherein the estimated time is a first estimated time and the instructions, when executed cause the at least one processor to determine a second estimated time associated with performance of the one or more other tasks associated with the first order; perform a comparison between the first estimated time and the second estimated time; and identify the second task based on the comparison.

Example 14 includes the at least one non-transitory computer readable medium of any of examples 10-13, wherein the instructions, when executed, cause the at least one processor to identify the second task based on a location of the autonomous vehicle in an environment in connection with the first task.

Example 15 includes an apparatus comprising at least one memory; instructions; and a processor to execute the instructions to allocate a first task associated with a first portion of an order to an autonomous vehicle; determine a first estimated time associated with performance of the first task; determine a second estimated time associated with performance of a second task, the second task associated with a second portion of the order, the second portion of the order different than the first portion of the order; calculate a difference between the first estimated time and the second estimated time; in response to the difference between the first estimated time and the second estimated time exceeding a threshold, allocate a third task to the autonomous vehicle; and instruct the autonomous vehicle to perform the third task.

Example 16 includes the apparatus of example 15, wherein the third task is associated with the order or a second order.

Example 17 includes the apparatus of examples 15 or 16, wherein the processor is to determine the first estimated time based on location data for the autonomous vehicle.

Example 18 includes the apparatus of any of examples 15-17, wherein the processor is to select the third task based on a third estimated time associated with performance of the third task by the autonomous vehicle.

Example 19 includes the apparatus of any of examples 15-18, wherein the processor is to allocate the first task to the autonomous vehicle based on a property of a product in the first portion of the order.

Example 20 includes the apparatus of any of examples 15-19, wherein the processor is to output instructions to a user device to allocate the second task to a user based on a property of a product in the second portion of the order.

The following claims are hereby incorporated into this Detailed Description by this reference. Although certain example systems, methods, apparatus, and articles of manufacture have been disclosed herein, the scope of coverage of this patent is not limited thereto. On the contrary, this patent covers all systems, methods, apparatus, and articles of manufacture fairly falling within the scope of the claims of this patent.

What is claimed is:

1. An apparatus comprising:
   at least one memory;
   machine-readable instructions; and
   processor circuitry to execute the machine-readable instructions to at least:
   determine a first expected arrival time of an autonomous vehicle at a first location, the autonomous vehicle to deliver a first product to the first location in response to a first task assigned to the autonomous vehicle, the first product associated with a first order;
   perform a comparison between the first expected arrival time and a second expected arrival time at the first location, the second expected arrival time associated with a second task, the second task to be performed by an entity different than the autonomous vehicle;
   select a third task to be performed by the autonomous vehicle based on the comparison, the third task selected for having the autonomous vehicle arrive at the first location after performance of the first task and the third task and within a threshold time of the second expected arrival time; and
   instruct the autonomous vehicle to perform the third task.

2. The apparatus of claim 1, wherein the autonomous vehicle is a first autonomous vehicle and the second task is to be performed by a second autonomous vehicle.

3. The apparatus of claim 1, wherein the processor circuitry is to identify the third task based on a distance of the autonomous vehicle from the first location and a location associated with the third task.

4. The apparatus of claim 1, wherein the processor circuitry is to determine the first expected arrival time for the autonomous vehicle at the first location based on reference delivery time data for the autonomous vehicle.

5. The apparatus of claim 1, wherein the second task includes delivery of a second product to the first location and the processor circuitry is to determine the second expected arrival time based on reference delivery time data for the second task.

6. The apparatus of claim 1, wherein the first location is associated with a warehouse and the processor circuitry is to determine that the performance of the third task will cause the autonomous vehicle to arrive at the first location within the threshold time of the second expected arrival time based on traffic data for a plurality of autonomous vehicles in the warehouse.

7. The apparatus of claim 1, wherein the processor circuitry is to:
   predict an amount of time associated with performance of the third task; and
   select the third task based on the predicted amount of time for the third task.

8. The apparatus of claim 1, wherein the processor circuitry is to determine the first expected arrival time based on one or more other orders assigned to the autonomous vehicle.

9. The apparatus of claim 1, wherein the second task includes delivery of a second product to the first location and the processor circuitry is to select the third task for having the autonomous vehicle arrive at the first location after the performance of the second task and within the threshold time of the second expected arrival time.

10. At least one non-transitory computer readable medium comprising instructions that, when executed, cause processor circuitry to at least:
    assign a first task to an autonomous vehicle in connection with a first order, the first order associated with one or more other tasks;
    monitor performance of the first task by the autonomous vehicle;
    identify a second task to be assigned to the autonomous vehicle based on the monitoring and the one or more other tasks associated with the first order, the second task associated with the first order or a second order;
    assign the second task to the autonomous vehicle, the assignment of the second task based on the performance of the first task and performance of the second task by the autonomous vehicle within a threshold time relative to the performance of the one or more other tasks, the one or more other tasks to be performed by an entity different than the autonomous vehicle; and
    instruct the autonomous vehicle to perform the second task.

11. The at least one non-transitory computer readable medium of claim 10, wherein the instructions, when executed, cause the processor circuitry to:
    determine an estimated time associated with the performance of the first task by the autonomous vehicle; and
    identify the second task based on the estimated time.

12. The at least one non-transitory computer readable medium of claim 11, wherein the instructions, when executed, cause the processor circuitry to adjust the estimated time based on the monitoring.

13. The at least one non-transitory computer readable medium of claim 11, wherein the estimated time is a first estimated time and the instructions, when executed cause the processor circuitry to:
    determine a second estimated time associated with performance of the one or more other tasks associated with the first order;
    perform a comparison between the first estimated time and the second estimated time; and
    identify the second task based on the comparison.

14. The at least one non-transitory computer readable medium of claim 10, wherein the instructions, when executed, cause the processor circuitry to identify the second task based on a location of the autonomous vehicle in an environment in connection with the first task.

15. An apparatus comprising:
    at least one memory;
    machine-readable instructions; and
    processor circuitry to execute the machine-readable instructions to at least:

allocate a first task associated with a first portion of an order to an autonomous vehicle;

determine a first estimated time associated with performance of the first task;

determine a second estimated time associated with performance of a second task, the second task associated with a second portion of the order, the second portion of the order different than the first portion of the order, the second task to be performed by an entity different than the autonomous vehicle;

calculate a difference between the first estimated time and the second estimated time;

in response to the difference between the first estimated time and the second estimated time exceeding a threshold, allocate a third task to the autonomous vehicle; and instruct the autonomous vehicle to perform the third task.

16. The apparatus of claim 15, wherein the order is a first order and the third task is associated with the first order or a second order.

17. The apparatus of claim 15, wherein the processor circuitry is to determine the first estimated time based on location data for the autonomous vehicle.

18. The apparatus of claim 15, wherein the processor circuitry is to select the third task based on a third estimated time associated with performance of the third task by the autonomous vehicle.

19. The apparatus of claim 15, wherein the processor circuitry is to allocate the first task to the autonomous vehicle based on a property of a product in the first portion of the order.

20. The apparatus of claim 19, wherein the processor circuitry is to output instructions to a user device to cause the second task to be allocated to a user based on a property of a product in the second portion of the order.

\* \* \* \* \*